(12) United States Patent
Hegde et al.

(10) Patent No.: US 11,618,832 B2
(45) Date of Patent: Apr. 4, 2023

(54) COMPOSITIONS AND METHODS OF ADDITIVE MANUFACTURING OF AROMATIC THERMOPLASTICS AND ARTICLES MADE THEREFROM

(71) Applicant: VIRGINIA TECH INTELLECTUAL PROPERTIES, INC., Blacksburg, VA (US)

(72) Inventors: Maruti Hegde, Chapel Hill, NC (US); Timothy E. Long, Blacksburg, VA (US); Viswanath Meenakshisundaram, Santa Clara, CA (US); Christopher B. Williams, Blacksburg, VA (US); Nicholas Chartrain, Blacksburg, VA (US)

(73) Assignee: VIRGINIA TECH INTELLECTUAL PROPERTIES, INC., Blackburg, VA (US)

( * ) Notice: Subject to any disclaimer, the term of this patent is extended or adjusted under 35 U.S.C. 154(b) by 780 days.

(21) Appl. No.: 16/325,991

(22) PCT Filed: Aug. 17, 2017

(86) PCT No.: PCT/US2017/047426
§ 371 (c)(1),
(2) Date: Feb. 15, 2019

(87) PCT Pub. No.: WO2018/035368
PCT Pub. Date: Feb. 22, 2018

(65) Prior Publication Data
US 2020/0248015 A1      Aug. 6, 2020

Related U.S. Application Data

(60) Provisional application No. 62/375,968, filed on Aug. 17, 2016.

(51) Int. Cl.
| | |
|---|---|
| C08F 2/46 | (2006.01) |
| C08F 2/50 | (2006.01) |
| C08G 61/04 | (2006.01) |
| C09D 11/101 | (2014.01) |
| B33Y 70/00 | (2020.01) |
| C09D 11/102 | (2014.01) |
| B33Y 10/00 | (2015.01) |
| B29C 64/135 | (2017.01) |

(52) U.S. Cl.
CPC ............ *C09D 11/101* (2013.01); *B33Y 70/00* (2014.12); *C09D 11/102* (2013.01); *B29C 64/135* (2017.08); *B33Y 10/00* (2014.12)

(58) Field of Classification Search
CPC .. C09D 11/102; C09D 11/101; C08G 73/127; C08G 73/122; C08G 73/105; C08G 73/1071; C08G 73/101; C08G 73/1028; C08G 73/22; B33Y 70/00; B33Y 10/00; B29C 64/135; B29C 64/124
USPC ........................... 522/6, 189, 184, 71; 520/1
See application file for complete search history.

(56) References Cited

U.S. PATENT DOCUMENTS

| | | | |
|---|---|---|---|
| 4,978,733 A | 12/1990 | Khanna | |
| 5,821,032 A | 10/1998 | Dominh | |
| 2011/0278049 A1 | 11/2011 | Kim et al. | |
| 2016/0177062 A1 | 6/2016 | Sato et al. | |

FOREIGN PATENT DOCUMENTS

| | | | |
|---|---|---|---|
| EP | 0 624 826 A1 | 11/1994 | |
| JP | H06 102667 A | 4/1994 | |
| KR | 1020130113823 | * 10/2013 | |

OTHER PUBLICATIONS

Meyer et al. "Soft Polymers for Building up Small and Smallest Blood Supplying Systems by Stereolithography", J. Funct. Biomater. 2012, 3, p. 257-268. (Year: 2012).*
Hsu et al. Synthesis and characterization of novel negative-working aqueous base developable photosensitive polyimide precursors, Polymer 45, Year 2004, p. 1101-1109. (Year: 2004).*
Kim et al, KR 1020130113823 Machine Translation, Oct. 16, 2013 (Year: 2013).*
Hsu et al, Synthesis and characterization of novel negative-working aqueous base developable photosensitive polyimide precurosors, 2004, Polymer 45, 1101-1109 (Year: 2004).*
Meyer, et al. Soft Polymers for Building up Small and Smallest Blood Supplying Systems by Stereolithography in J. Funct. Biomater. 2012, vol. 3, pp. 257-268.
Hsu, et al. Synthesis and characterization of novel negative-working aqueous base developable photosensitive polyimide precursors in Polymer 2004, vol. 45, pp. 1101-1109.

* cited by examiner

*Primary Examiner* — Jessica Whiteley
(74) *Attorney, Agent, or Firm* — Innovators Legal

(57) ABSTRACT

Polymer resins for the vat photopolymerization of thermoplastics are provided, in particular for the vat photopolymerization of thermoplastics with exception thermal stability and mechanical properties. In some aspects, the polymer resins are prepared by ring opening of an aromatic dianhydride with an alcohol containing an acrylate or methacrylate to produce a photocrosslinkable diacid monomer; conversion of the photocrosslinkable diacid monomer to a photocrosslinkable diacyl chloride; and polymerization of the photocrosslinkable diacyl chloride with an aromatic diamine to produce a photocrosslinkable precursor polymer. Upon crosslinking and drying, a thermal imidization can yield aromatic polyimide polymers with high yield and with micron-scale structural resolution.

3 Claims, 19 Drawing Sheets

COMPOSITIONS AND METHODS OF ADDITIVE MANUFACTURING OF AROMATIC THERMOPLASTICS AND ARTICLES MADE THEREFROM

CROSS-REFERENCE TO RELATED APPLICATIONS

This application is the 35 U.S.C. § 371 national stage application of PCT Application No. PCT/US2017/047426, filed Aug. 17, 2017, where the PCT claims priority to, and the benefit of, U.S. provisional application entitled "3D PRINTING ALL-AROMATIC, HIGH PERFORMANCE POLYIMIDES AND POLYBENZOXAZOLES USING STEREOLITHOGRAPHY (SLA): PROCESSING THE UNPROCESSABLE" having Ser. No. 62/375,968, filed Aug. 17, 2016, both of which are herein incorporated by reference in their entireties.

TECHNICAL FIELD

The present disclosure generally relates to additive manufacturing methods, additive manufacturing compositions, and articles made therefrom.

BACKGROUND

High-performance engineering thermoplastics typically contain highly aromatic molecular structures leading to glass transition temperatures ($T_g$) above 200° C., degradation temperatures ($T_d$) above 500° C., and excellent mechanical properties (Young's modulus exceeding 1 GPa). Their high thermal stability facilitates impact in aerospace, automotive, and microelectronics industries. However, an all-aromatic molecular structure limits their application due to melt processing challenges. The thermal resistance of these polymers makes processing using conventional melt processing essentially impossible.

Current solutions involve a compromise between processability and properties. Energy-intensive molding processes result in limited resolution and complexity. Moreover, dimensional stability of the molded components is extremely sensitive to the presence of moisture. Overcoming the processing barriers of high-temperature polyimides without compromising their molecular architecture requires unique synthetic and manufacturing strategies.

Stereolithography is an additive manufacturing process that works by focusing an ultraviolet (UV) laser on a vat of polymerizable photopolymer resin. Complex three-dimensional structures can be built in a layer-by-layer fashion. Manufacturing using mask-projection stereolithography (MPSL) requires a photo-crosslinkable site in the polymeric (or monomeric) material. Typically, the polymeric design integrates an inert core with photo-crosslinkable moieties such as acrylates or epoxies. The preparation of complex scaffolds for tissue and cell growth represents a recent application of MPSL. While these reports highlight the importance of multifunctional polymers as 3D-printable materials, the biological focus has restricted the field to aliphatic polymers and oligomers. The $T_d$ of these aliphatic polymers is generally lower than 400° C with $T_g$ usually below 100° C. Only a few high-$T_d$, 3D printable polymers such as cyanate ester resins exist. Furthermore, the limited range of engineering polymers available for 3D printing using MPSL is further constrained to thermosets due to molecular design constraints. There is a need for new functional polymeric materials for unlocking the potential of 3D printing with MPSL.

There remains a need for compositions for additive manufacturing and 3D printing, methods of making, and uses thereof that overcome the aforementioned deficiencies.

SUMMARY

A variety of polymer resins are provided suitable for additive manufacturing and 3D printing of aromatic thermoplastic polymers. Methods of making the polymer resins, and methods of using the polymer resins for 3D printing are provided. Additionally, articles of manufacture prepared from the resins and methods described herein are also provided. The articles can include any article capable of being printed using stereolithographic techniques, such as thermal insulation panels for airplanes, spacecraft, satellites, and space suits, heat exchangers, bushings, bearings, sockets or constructive parts for automobiles and aerospace and automobile industry, gas permeation membranes, and gas separation membranes, and the like.

In some aspects, a polymer resin is provided for vat photopolymerization. The polymer resin can include a polyamic diacrylate ester or salt thereof, the polyamic diacrylate ester or salt comprising a plurality of photocrosslinkable groups pendantly attached thereto; a photoinitiator suitable for initiating crosslinking of the photocrosslinkable groups when exposed to a light source of a suitable wavelength and intensity; and a suitable organic solvent. In some aspects, the polyamic diacrylate ester or salt thereof has a number average molecular weight of about 40000 g/mol to about 60000 g/mol. In some aspects, the the polyamic diacrylate ester or salt thereof has a polydispersity of about 2 or less. In some aspects, the photocrosslinkable groups have a thermal decomposition temperature of about 350° C. or less. In some aspects, the photocrosslinkable groups include an acrylate, a methacrylate, or a combination thereof. In some aspects, upon drying the resin and heating to a temperature of about 200° C. to 350° C. the polyamic diacrylate ester or salt thereof undergoes thermal imidization to form a polyimide. In some aspects, the polyamic diacrylate ester or salt thereof is present at an amount of about 10 wt % to about 40 wt % based upon a total weight of the polymer resin.

In some aspects, polymer resins for vat photopolymerization are provided including (1) a photocrosslinkable precursor polymer with repeat units having a structure according to the following formula

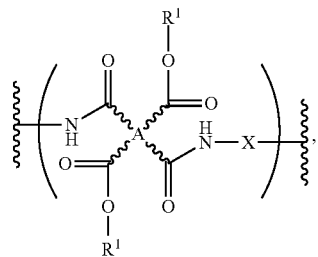

(2) a photointiator suitable for initiating crosslinking of the $R^1$ when exposed to a light source of a suitable wavelength and intensity; and (3) a suitable organic solvent.

In some aspects, polymer resins for vat photopolymerization are provided including (1) a photocrosslinkable precursor polymer with repeat units having a structure according to the following formula

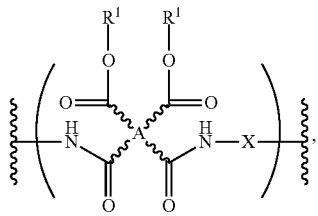

(2) a photointiator suitable for initiating crosslinking of the $R^1$ when exposed to a light source of a suitable wavelength and intensity; and (3) a suitable organic solvent.

In the above formulas, $R^1$ can have a structure according to the following formula

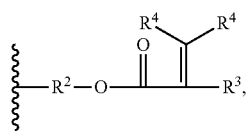

wherein each occurrence of $R^2$ is independently a linear or branched alkyl group having from 1 to 6 carbon atoms, wherein each occurrence of $R^3$ is independently a hydrogen or a methyl, and wherein each occurrence of $R^4$ is independently a hydrogen, a linear alkyl group, or a branched alkyl group having from 1 to 12, 1 to 7, 1 to 6, 1 to 5, 1 to 4, 1 to 3, 1 to 2, 1, or 2 to 5 carbon atoms.

In the above formulas, each occurrence of X and A is independently a substituted or unsubstituted aromatic group. In some aspects. X is a substituted aromatic group having one or more hydroxy or methoxy substituents adjacent to the N substituent. In some aspects, of A is independently selected from the group of substituted and unsubstituted phenyl, substituted and unsubstituted biphenyl, substituted and unsubstituted diphenyl ether, substituted and unsubstituted benzophenone, substituted and unsubstituted (perfluoropropane-2,2-diyl)phenyl, substituted and unsubstituted propane-2,2-diylphenyl, sulfonyldiphenyl, and substituted and unsubstituted diphenylacetylene. In some aspects, A is independently selected from the group consisting of

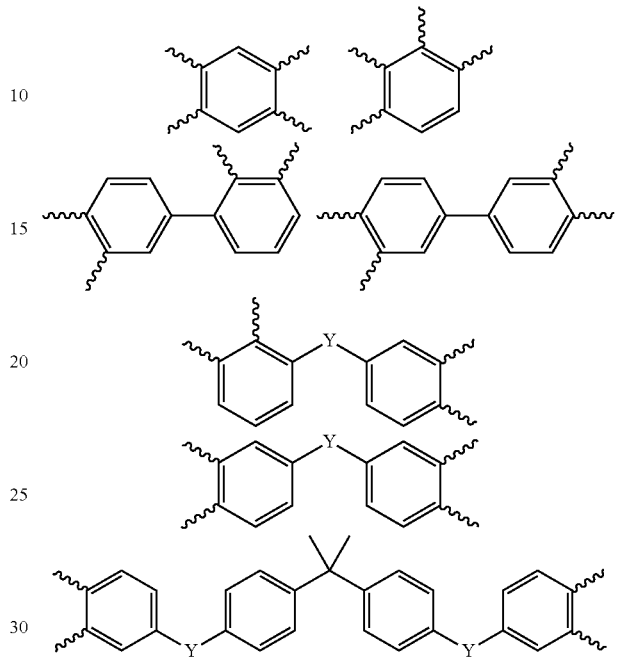

where Y is selected from the group consisting of O, S, C=O, $C(CF_3)_2$, $C(CH_3)_2$, $SO_2$, and C≡C.

The resins can include a suitable organic solvent. In some aspects, the solvent can include of N-methyl-2-pyrrolidone (NMP), dimethylacetamide (DMAC), dimethylformamide (DMF), or mixtures thereof.

N some aspects, the photointiator is a phosphine oxide such as phenylbis(2,4,6-trimethylbenzoyl)phosphine. The suitable wavelength can include, for example about 300 nm to 500 nm. In some instances, the photoinitiator is present in an amount from about 1.5 wt % to about 5 wt % based upon a total weight of the polymer resin.

A variety of photocrosslinkable precursor polymers suitable for carrying out the printing methods are described herein. In some aspects, the photocrosslinkable precursor polymer includes repeat units having a structure according to one of the following formulas

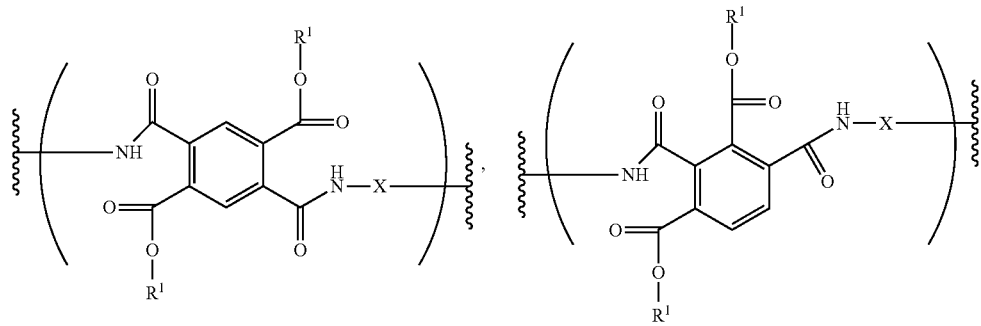

-continued
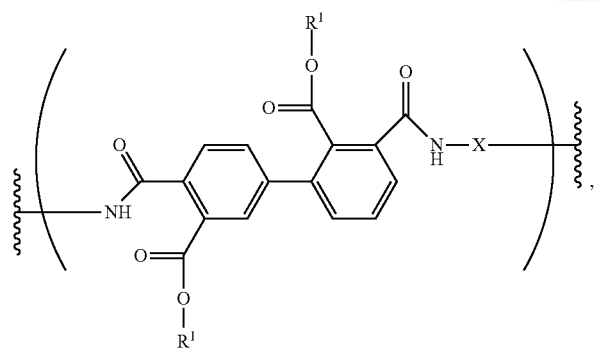
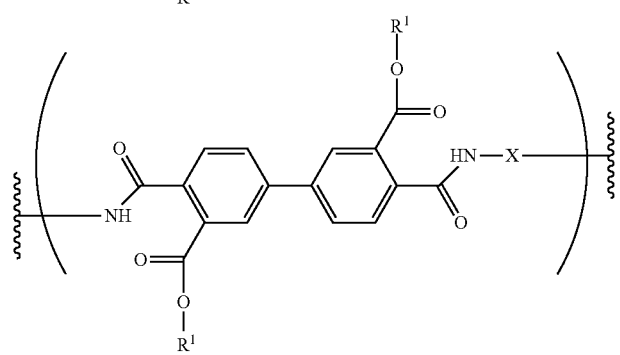
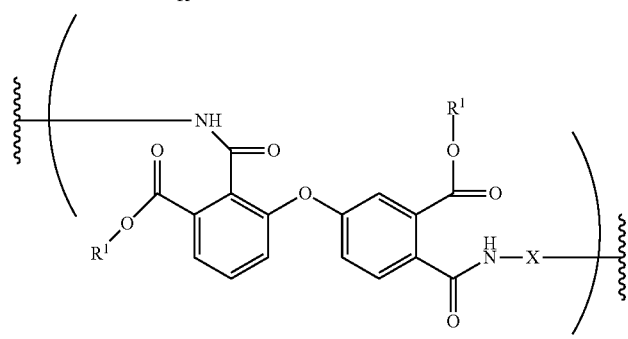
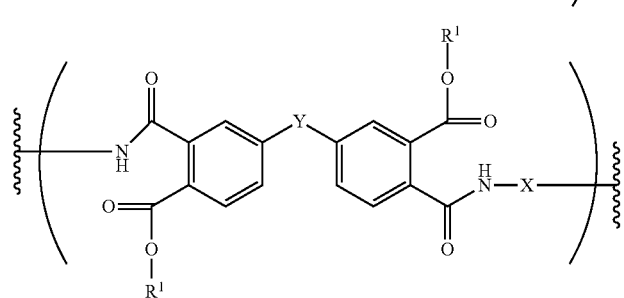
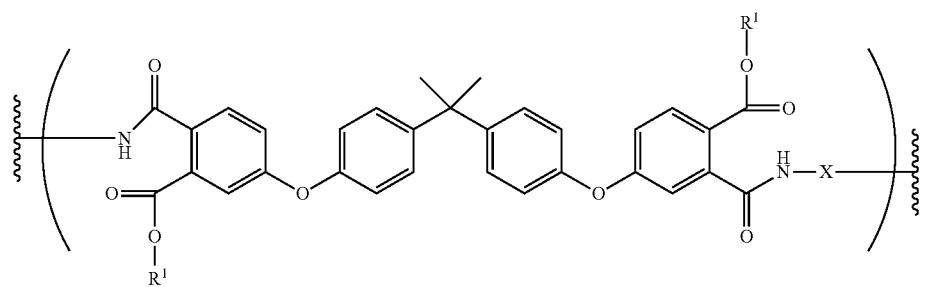

-continued

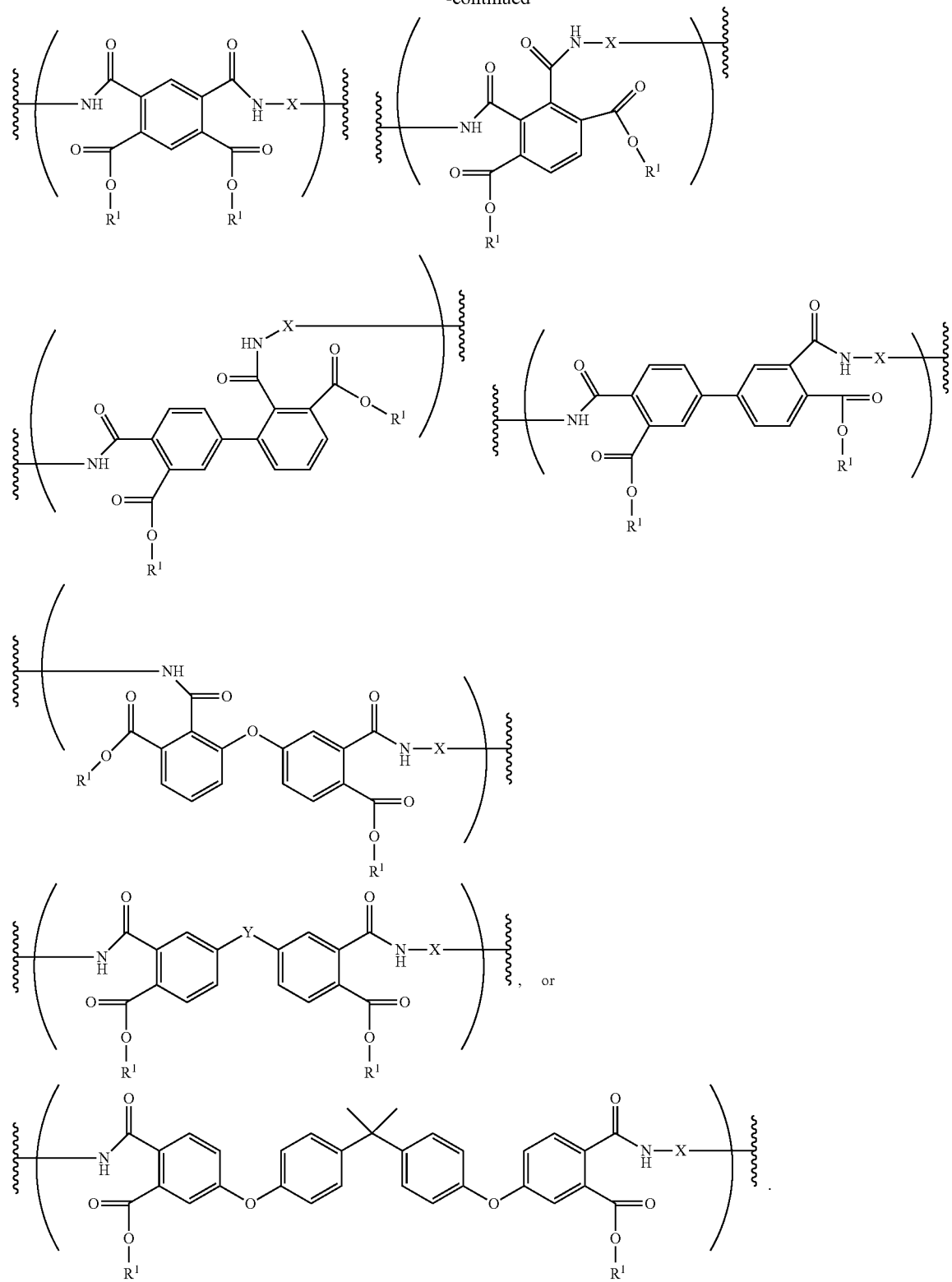

In some aspects, X in the above formulas can include substituted and unsubstituted phenyl, substituted and unsubstituted biphenyl, substituted and unsubstituted, substituted and unsubstituted diphenyl ether, substituted and unsubstituted benzophenone, substituted and unsubstituted (perfluoropropane-2,2-diyl)phenyl, substituted and unsubstituted propane-2,2-diylphenyl, sulfonyldiphenyl, substituted and unsubstituted fluorene, substituted and unsubstituted naphthyl, or substituted and unsubstituted pyrene. In some instances, X is selected from the group consisting of

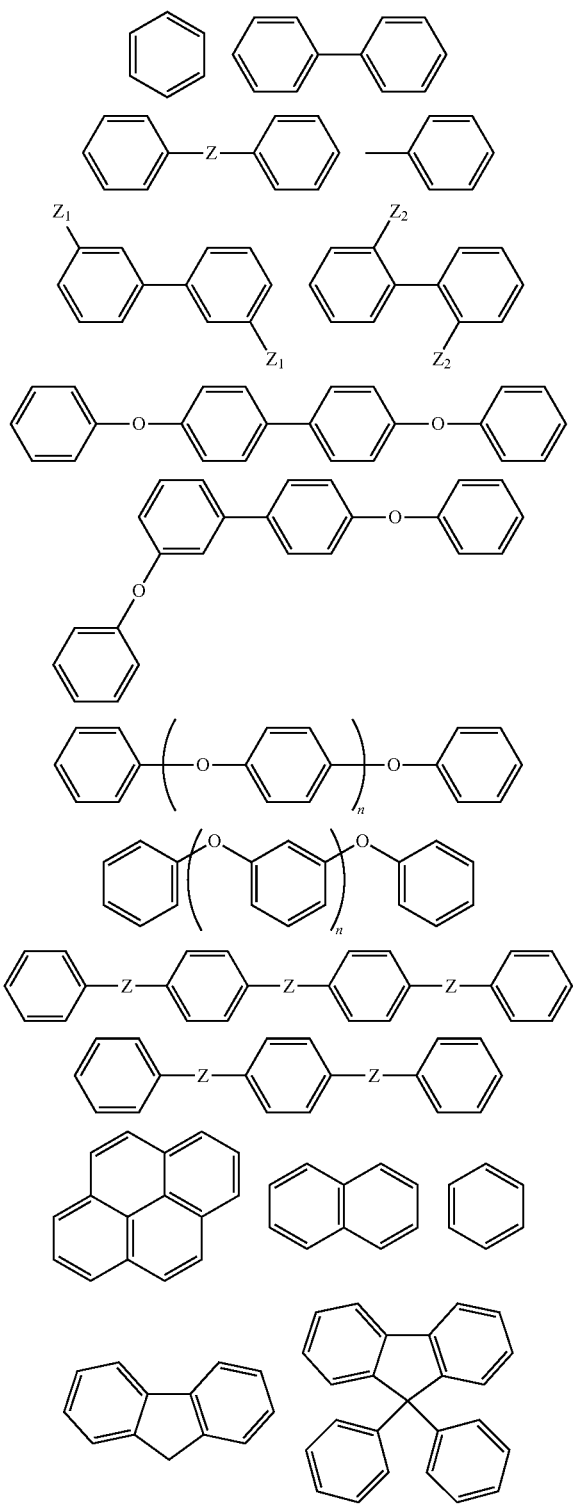

where each occurrence of Z is independently O, $CH_2$, $CH_2CH_2$, $SO_2$, $C(CF_3)_2$, $C(CH_3)_2$, S, S—S, CH═CH, C═O, C≡C, or NH; where each occurrence of $Z_1$ is independently H, Cl, OH, $OCH_3$, $CH_3$, or $CH_2CH_3$; where each occurrence of $Z_2$ is independently H, $CH_3$, $CF_3$, or $SO_3H$; and where each occurrence of n is independently 0, 1, 2, or 3.

In some aspects, the photocrosslinkable precursor polymer has a structure according to the following formula

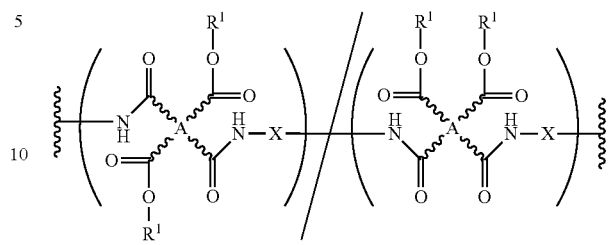

where A, X, and $R^1$ are as described above.

The resins can also include a suitable UV blocker. For example, the UV blocker can include UV blockers such as benzophenones, benzotriazoles, diazines and triazines, benzoates, oxalanilide, azobenzones, metal oxides (zinc oxide, titanium dioxide). In some aspects, the UV blocker is present in an amount from 0.1% to 3% by weight based upon the total weight of the polymer resin. In some aspects, the UV blocker is present in an amount from 0% to 3% by weight based upon the total weight of the polymer resin. Examples of UV blockers can include 4-nitrophenol, 2,5-Bis(5-tert-butyl-benzoxazol-2-yl)thiophene, 2-hydroxy-4-methoxy benzophenone, 1-(4-Methoxyphenyl)-3-(4-tert-butylphenyl) propane-1,3-dione, disodium 2,2'-(1,4-phenylene)bis(6-sulfo-1H-benzimidazole-4-sulfonate), Hexyl 2-[4-(diethylamino)-2-hydroxybenzoyl]benzoate, Menthyl-o-aminobenzoate, 2,2'-[6-(4-methoxyphenyl)-1,3,5-triazine-2,4-diyl] bis{5-[(2-ethylhexyl)oxy]phenol}, 2,4-dihydroxybenzophenone, 2,2',4,4'-tetrahydroxybenzophenone, 4-Hydroxy-2-methoxy-5-(oxophenylmethyl)benzenesulfonic acid, 2,2'-dihydroxy-4,4'-dimethoxybenzophenone, 5-chloro-2-hydroxybenzophenone, (2-Hydroxy-4-methoxyphenyl)-(2-hydroxyphenyl)methanone, sodium 2,2'-dihydroxy-4,4'-dimethoxybenzophenone-5,5'-disulfonate, (2-Hydroxy-4-methoxyphenyl) (4-methylphenyl) methanone, "(2-hydroxy-4-octoxy-phenyl)-phenyl-methanone, 2-(1,2,3-Benzotriazol-2-yl)-4-methyl-6-[2-methyl-3-(2,2,4,6,6-pentamethyl-3,5-dioxa-2,4,6-trisilaheptan-4-yl)propyl] phenol, Terephthalylidene dicamphor sulfonic acid, 2-ethylhexyl 2-cyano-3,3-diphenyl-2-propenoate, Diethylhexyl butamido triazone, 2-Ethoxyethyl 3-(4-methoxyphenyl)propenoate, Isopentyl 4-methoxycinnamate, 2,2'-methanediylbis[6-(2H-benzotriazol-2-yl)-4-(2,4,4-trimethylpentan-2-yl)phenol], 2-(2H-Benzotriazol-2-yl)-4-(1,1,3,3-tetramethylbutyl)phenol, 2,2'-Methylenebis[6-(2H-benzotriazol-2-yl)-4-(1,1,3,3-tetramethylbutyl)phenol], 2-Hydroxy-4-(octyloxy)benzophenone, 2-ethyl-, 2-[4-(4,6-diphenyl-1,3,5-triazin-2-yl)-3-hydroxyphenoxy]ethyl ester, 2-tert-Butyl-6-(5-chloro-2H-benzotriazol-2-yl)-4-methylphenol, 2-(2-Hydroxy-5-methylphenyl)benzotriazole, 2,4-dinitrophenylhydrazine, N-(4-ethoxycarbonylphenyl)-N'-methyl-N'-phenylformamidine, Hexadecyl 3,5-bis-tert-butyl-4-hydroxybenzoate, and 2-Ethyl-2'-ethoxyoxalanilide.

The resins can include a free radical scavenger and/or an antioxidant, e.g. present in quantities ranging from about 0.1% to 3% by weight based upon the total weight of the polymer resin. These can include hindered amine light stabilizers (HALS), e.g. those derived from 2,2,6,6-tetramethylpiperidine. Hindered phenols can also be used. Examples of HALS include 2,2,6,6-Tetramethyl-1-piperidinyloxy (TEMPO). Examples of antioxidants include Butylated hydroxytoluene (BHT), Mequinol (MEHQ), and Hydroquinone.

The resins can be used to print polyimide polymers. In some aspects, the polyimide has a thermal decomposition temperature of about 500° C. to about 700° C. In some aspects, the polyimide has a thermal decomposition temperature that is at least 150° C. higher than a thermal decomposition temperature of the photocrosslinkable groups Methods of making the polymer resins are also provided. The methods can include, for example, ring opening of an aromatic dianhydride with an alcohol containing an acrylate or methacrylate to produce a photocrosslinkable diacid monomer; conversion of the photocrosslinkable diacid monomer to a photocrosslinkable diacyl chloride; polymerization of the photocrosslinkable diacyl chloride with an aromatic diamine to produce a photocrosslinkable precursor polymer; and dissolving a photointiator and the photocrosslinkable precursor polymer in a suitable organic solvent.

In some aspects, the dianhydride has a structure such as

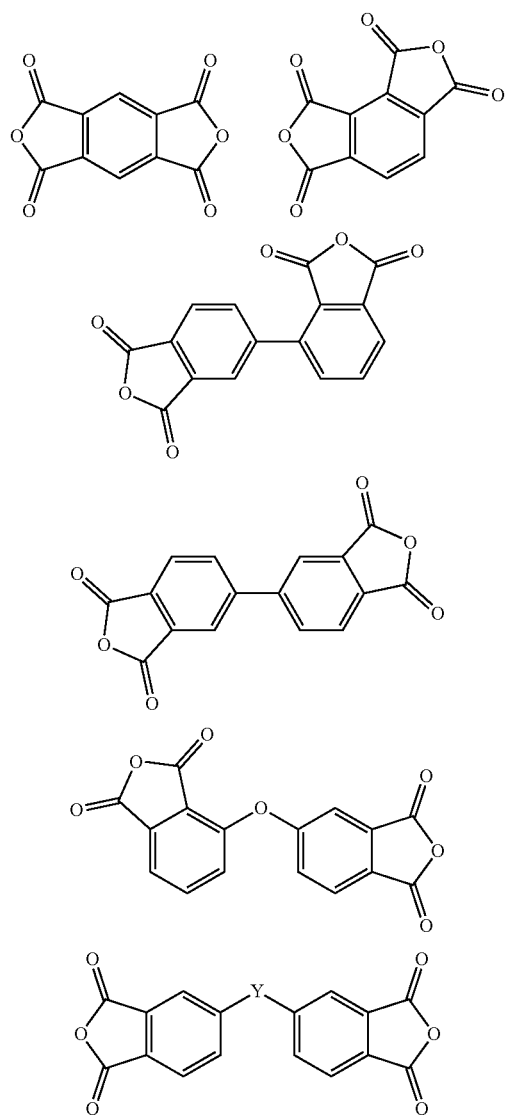

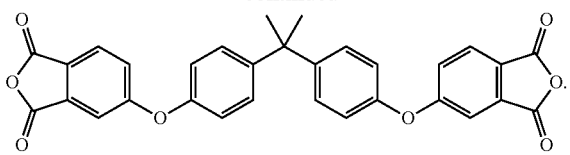

In some aspects, the alcohol has a structure according to the following,

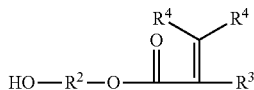

where R2, R3, and R4 are as described above.

In some aspects, the aromatic diamine is an aromatic group having two amine substituents attached thereto, wherein the aromatic group is selected from

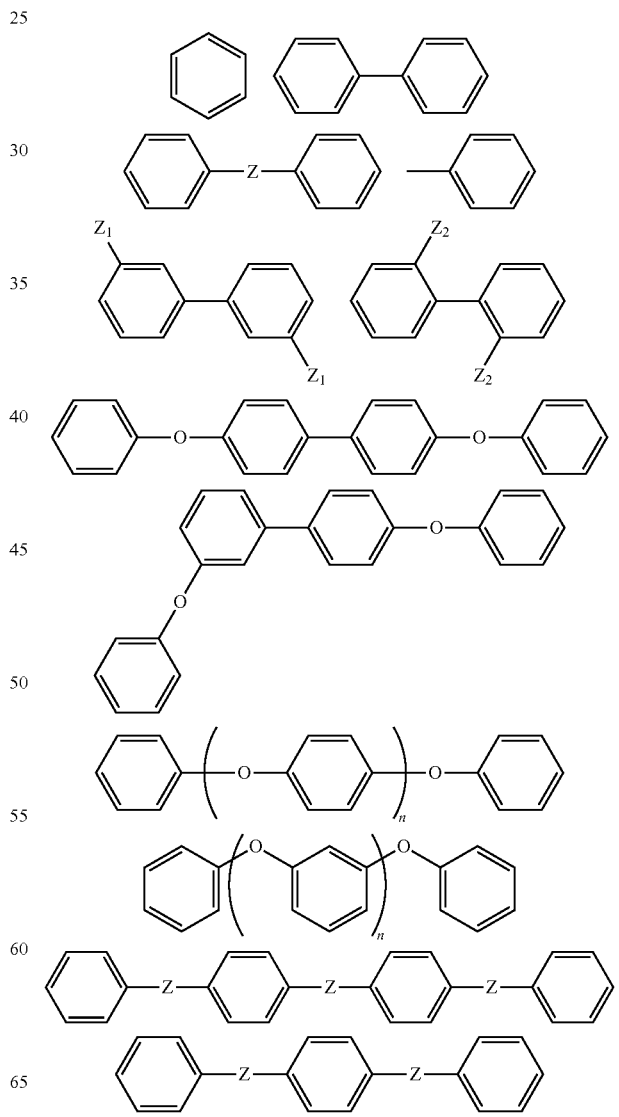

-continued

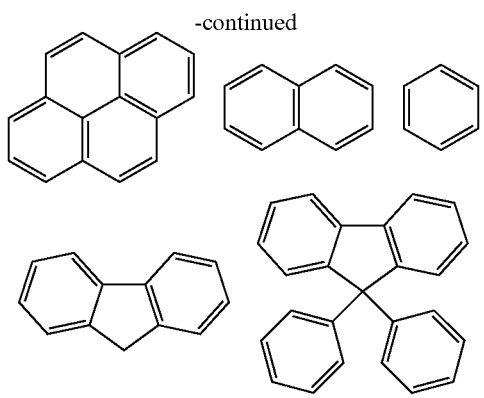

where the aromatic group comprises two amine substituents attached thereto, where each occurrence of Z is independently O, $CH_2$, $CH_2CH_2$, $SO_2$, $C(CF_3)_2$, $C(CH_3)_2$, S, S—S, CH=CH, C=O, C≡C, or NH; where each occurrence of $Z_1$ is independently H, Cl, OH, $OCH_3$, $CH_3$, or $CH_2CH_3$; where each occurrence of $Z_2$ is independently H, $CH_3$, $CF_3$, or $SO_3H$; and where each occurrence of n is independently 0, 1, 2, or 3.

Methods of making articles are provided, e.g. by stereolithographic or other vat photopolymerization methods. In some instances, the methods include (a) applying an effective amount of a light to a solution including a photocrosslinkable precursor polymer to crosslink the photocrosslinkable precursor polymer to form a layer of a precursor article, wherein the photocrosslinkable precursor polymer includes repeat units having a structure according to the following formula

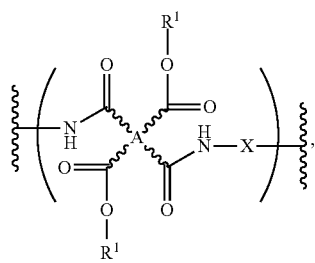

(b) repeating step (a) a number of times to form the precursor article in a layer-by-layer fashion; and (c) heating the precursor article to a first elevated temperature for a period of time to form the article including polyimide repeat units having a structure according to the following formula

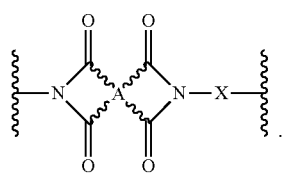

A, X, and $R^1$ can be as described above.

In some instances, the methods include (a) applying an effective amount of a light to a solution comprising a photocrosslinkable precursor polymer to crosslink the photocrosslinkable precursor polymer to form a layer of a precursor article, wherein the photocrosslinkable precursor polymer comprises repeat units having a structure according to the following formula

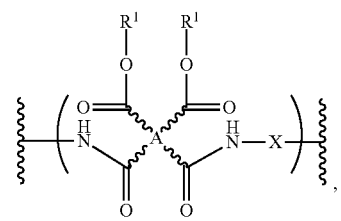

(b) repeating step (a) a number of times to form the precursor article in a layer-by-layer fashion; and (c) heating the precursor article to a first elevated temperature for a period of time to form the article comprising polyimide repeat units having a structure according to the following formula

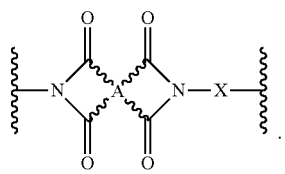

A, X, and $R^1$ can be as described above.

In some aspects, the methods include (a) applying an effective amount of a light to a solution comprising a photocrosslinkable precursor polymer to crosslink the photocrosslinkable precursor polymer to form a layer of a precursor article, wherein the photocrosslinkable precursor polymer comprises repeat units having a structure according to the following formula

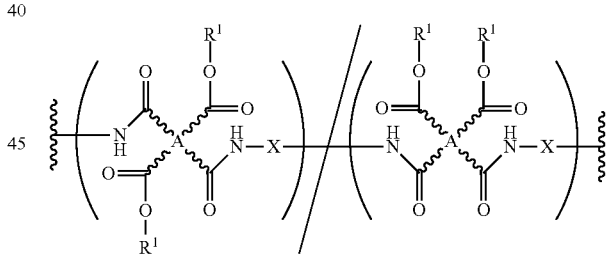

(b) repeating step (a) a number of times to form the precursor article in a layer-by-layer fashion; and (c) heating the precursor article to a first elevated temperature for a period of time to form the article comprising polyimide repeat units having a structure according to the following formula

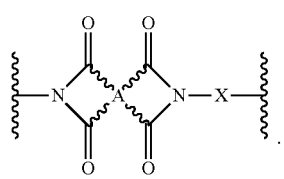

A, X, and $R^1$ can be as described above.

In some aspects, X is an aromatic group having one or more hydroxy or methoxy substituents adjacent to the amine substituent, and wherein the method further includes (d) heating the article to a second elevated temperature for a second period of time to convert at least some of the polyimide repeat units into polybenzoxazole repeat units having a structure according to the following formula

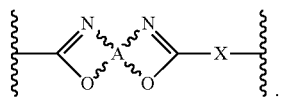

In some aspects, the methods include drying the precursor article to remove the solvent prior to forming the polyimide repeat units. For example, the drying can be performed by drying the precursor article in a vacuum oven for about 1 h. at one or more temperatures between 25° C. and 150° C. The article, after imidization and drying, can be essentially devoide of the layered structure, i.e. the article does not comprise a layered structure.

Other systems, methods, features, and advantages of resins and methods of making and uses thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

$$\% \text{ imidized} = \frac{(A_{1370}/A_{1495})_t}{(A_{1370}/A_{1495})_{t=0}} * 100$$

Figure 11:
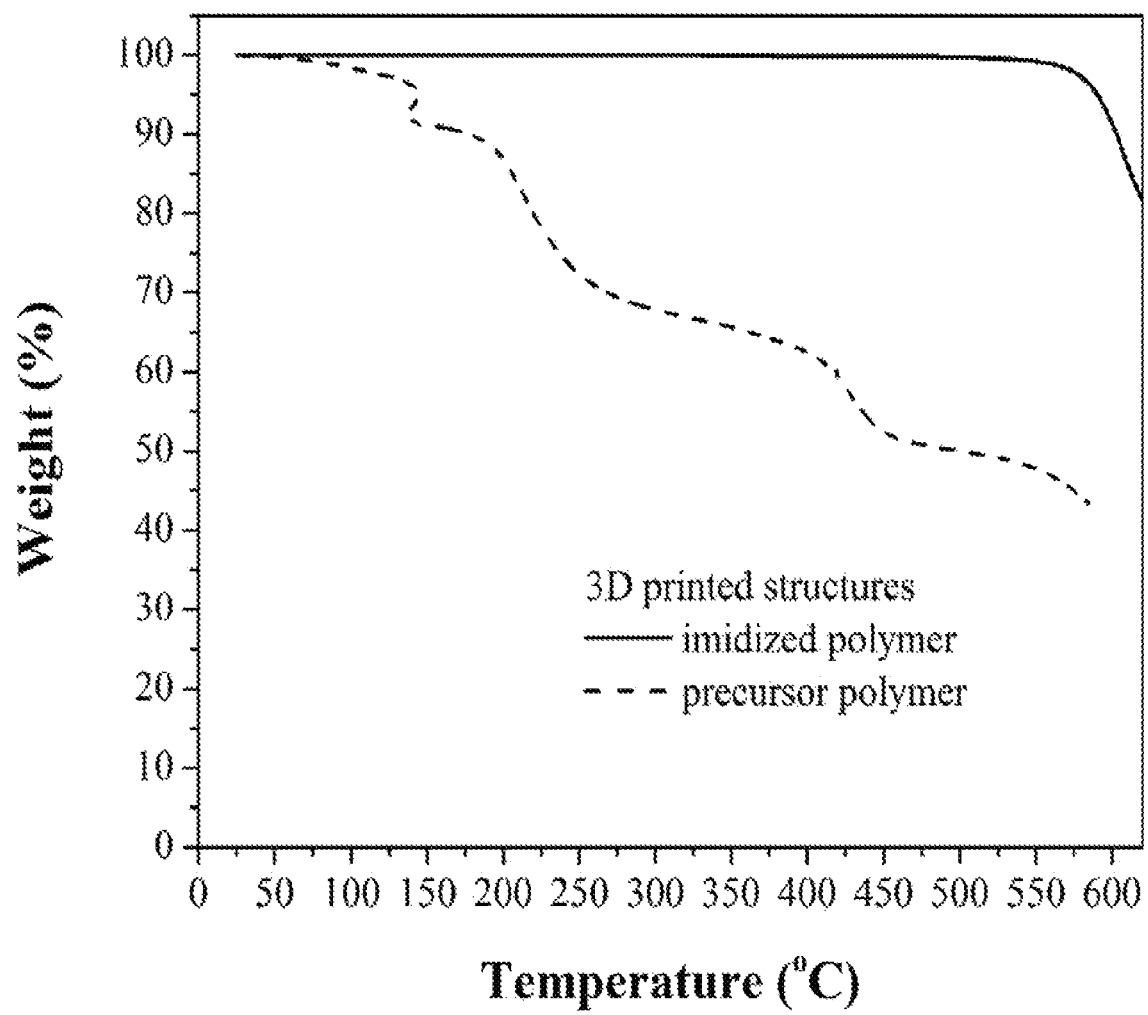

FIG. 11 is a graph of the TGA analysis of a partially dried 3D printed part and after complete imidization. After complete imidization, the onset of degradation of the obtained PMDA-ODA polyimide occurs at 590° C.

Figure 12:
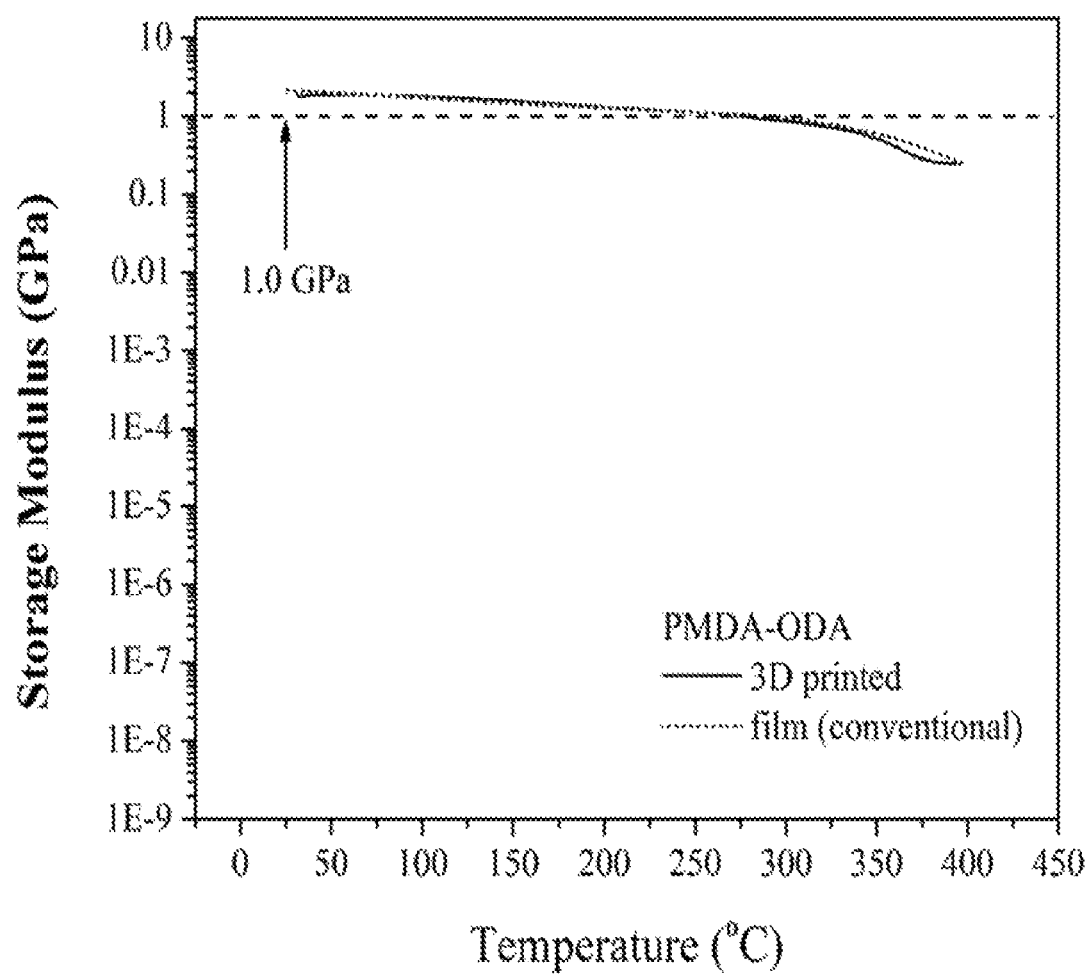

FIG. 12 is a graph of the storage modulus (E') from thermomechanical analysis at 1 Hz as a function of temperature. 3D printed PMDA-ODA is compared to a PMDA-ODA film prepared using the conventional 2-step synthetic route.

Figure 13:
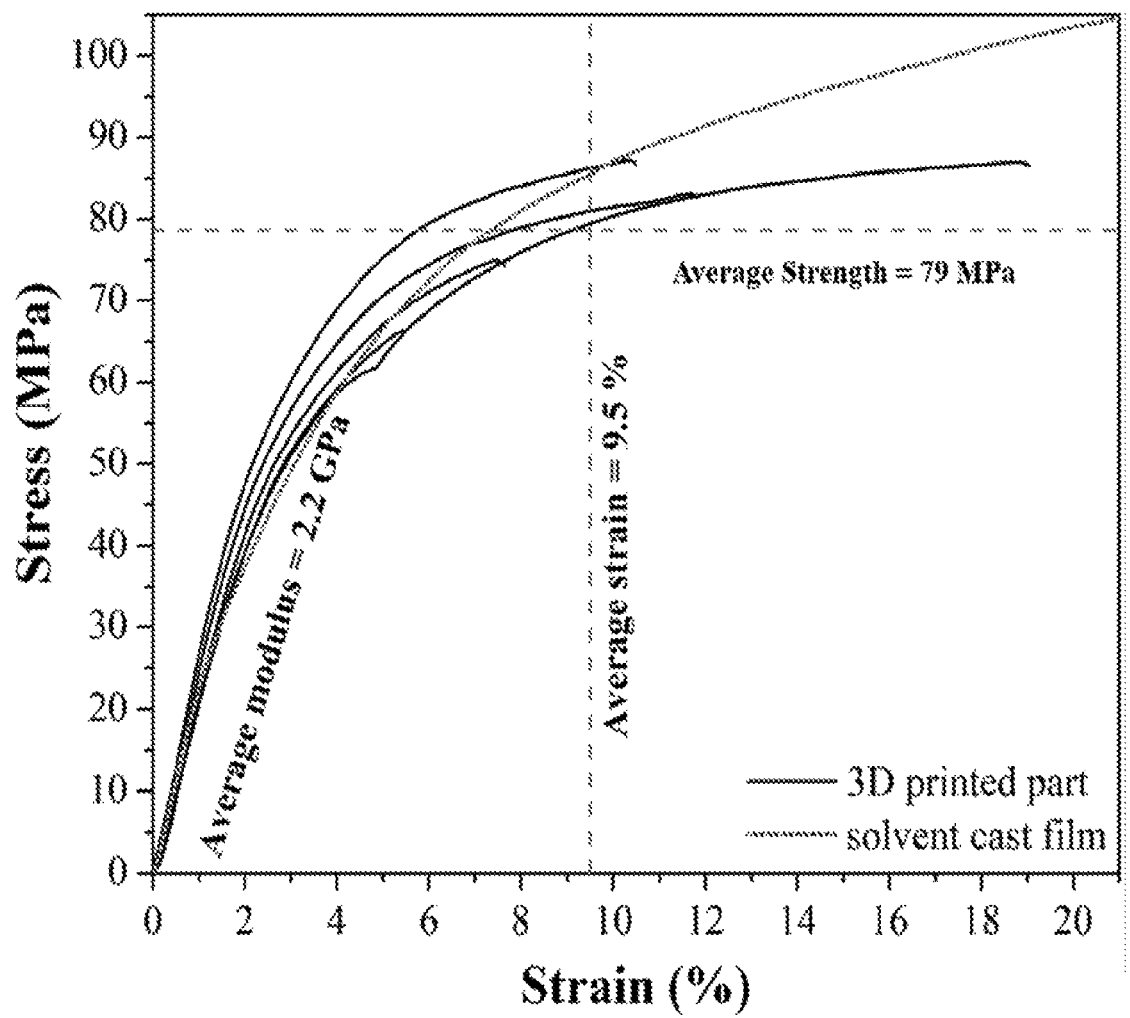

FIG. 13 is a graph of the stress-strain curves from tensile measurements of 3D printed specimens. Results are overlaid with the stress-strain curve obtained for a conventional film. The film exhibits fracture at 60% strain, and an ultimate tensile strength of 150 MPa.

Figure 14:
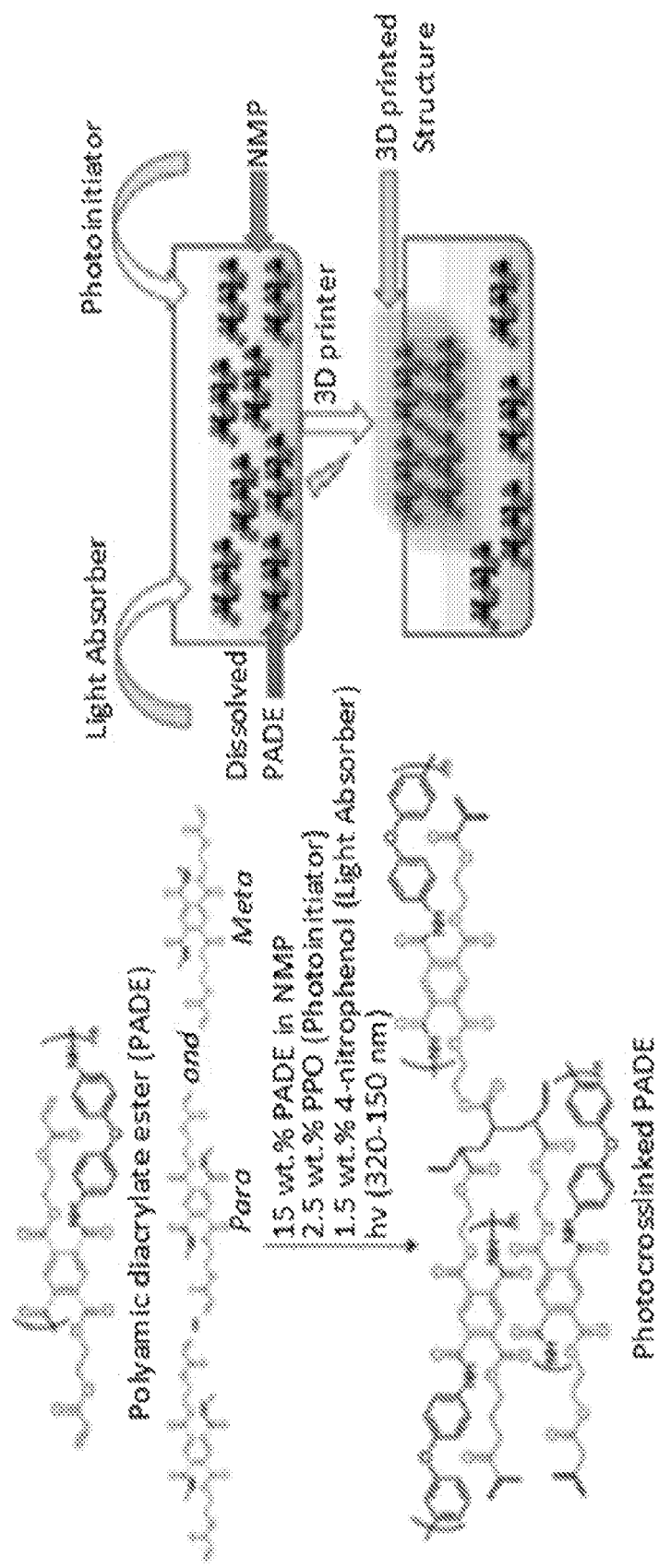

FIG. 14 depicts the molecular structure of the soluble, photo-crosslinkable PADE precursor polymer. The PADE polymer is a random copolymer comprise of para- and meta-amic esters. Each repeating unit contains two photo-crosslinkable acrylate groups. A molecular scheme and representation of the crosslinking process during MPSL is also included.

Figure 15:
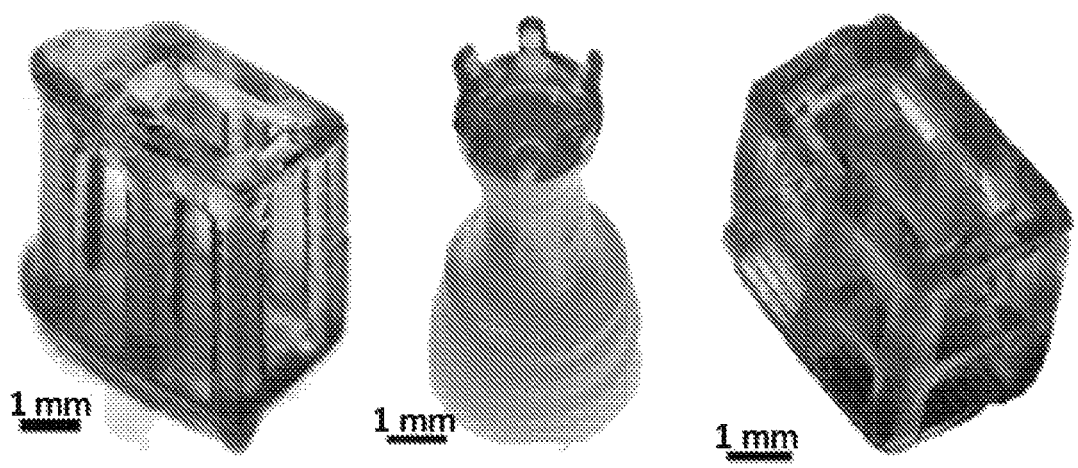

FIG. 15 is a set of images of complex 3D structures immediately after printing using mask-projection microstereolithography (MPSSL). The 3D structures contain 85 wt % NMP.

Figure 16:
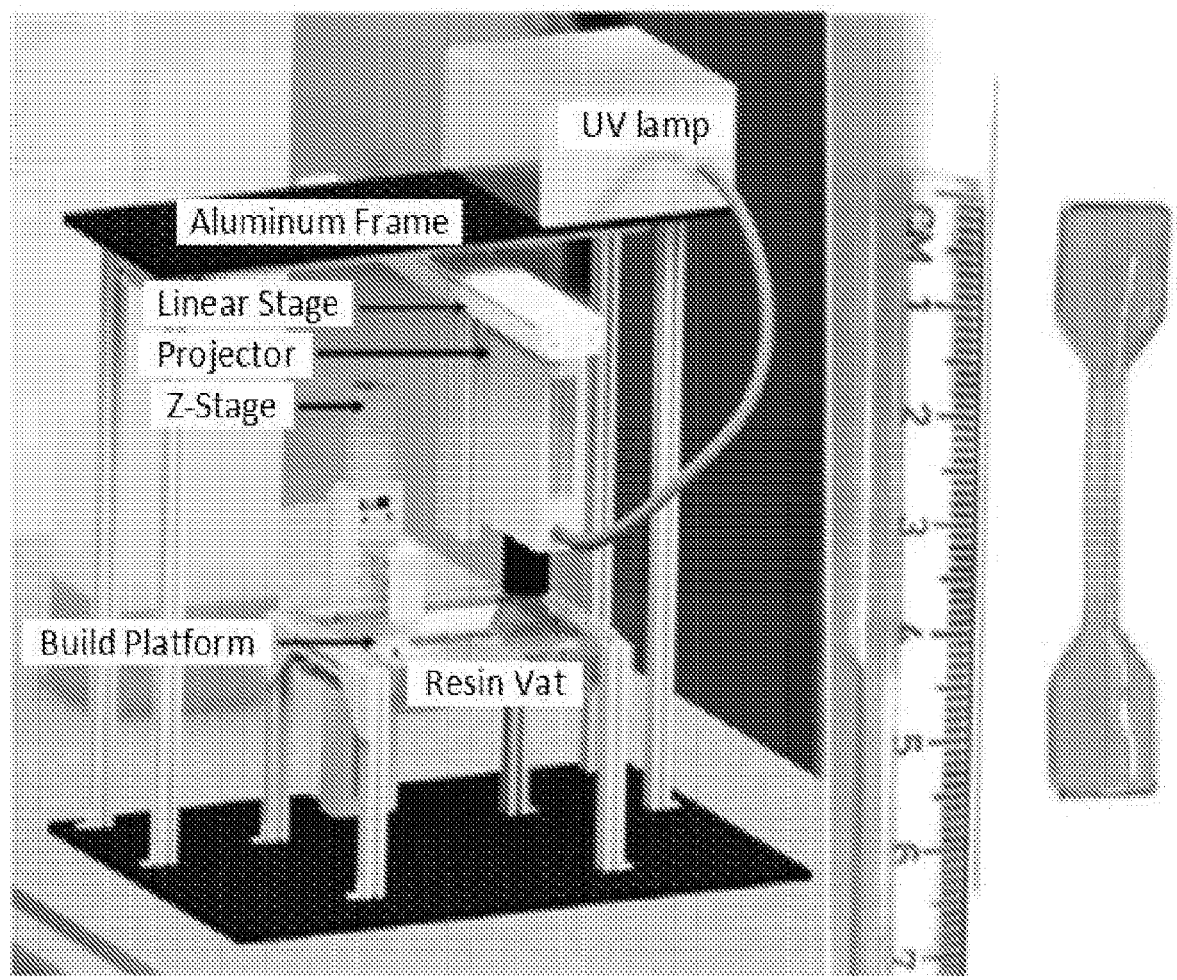

FIG. 16 is a 3D schematic of the large-area mask-projection scanning stereolithography (MPSSL) printer and an image of the 3D-printed tensile bar.

Figure 17:
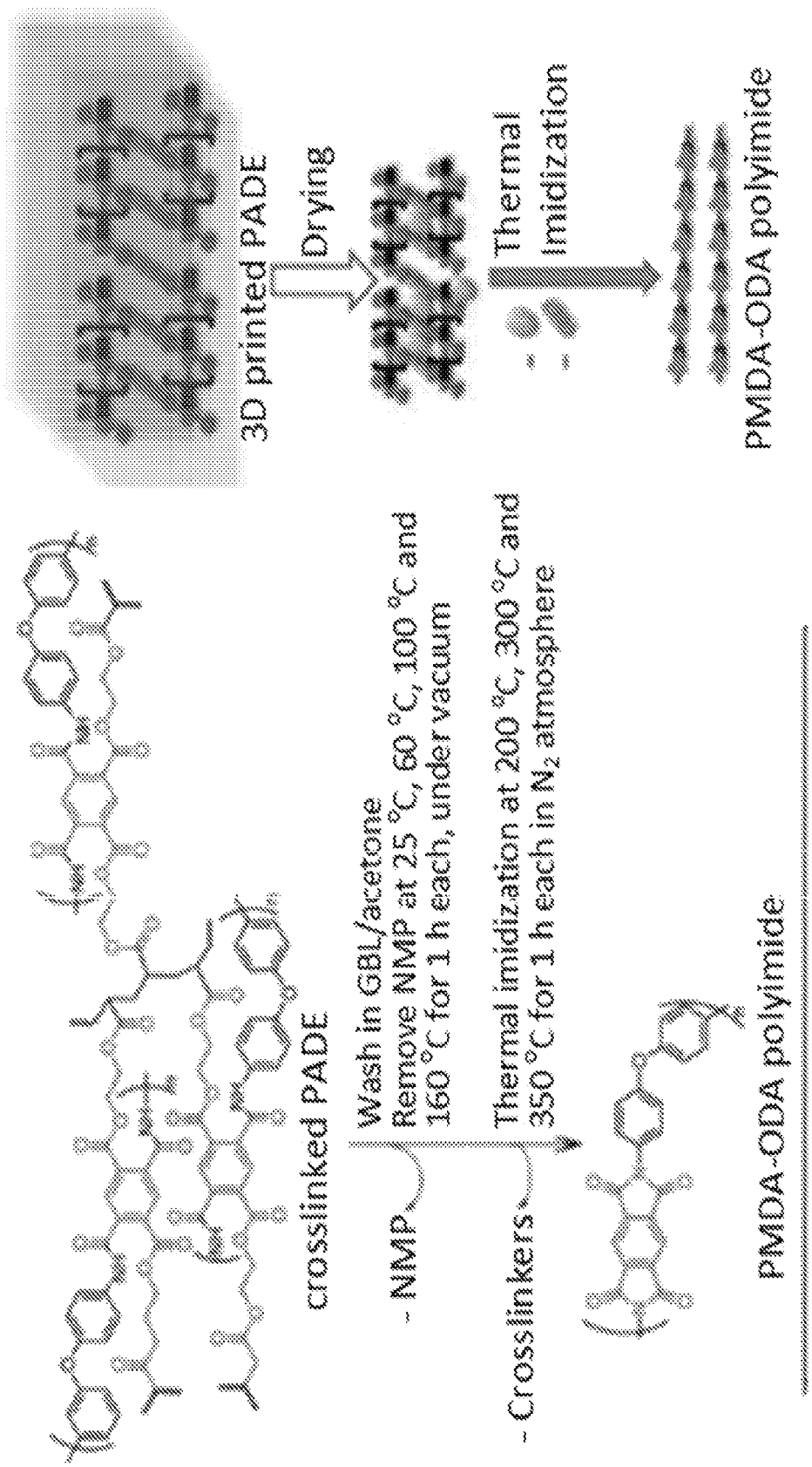

FIG. 17 depicts the postprinting process of 3D-printed structure to obtain thermoplastic, engineering PMDA-ODA polyimide. Molecular scheme and representation of the postprinting process steps to obtain PMDA-ODA. The procedure entailed removal of the solvent (NMP), followed by thermal imidization in steps, up to 350° C. to obtain 3D structures of PMDA-ODA polyimide.

Figure 18:
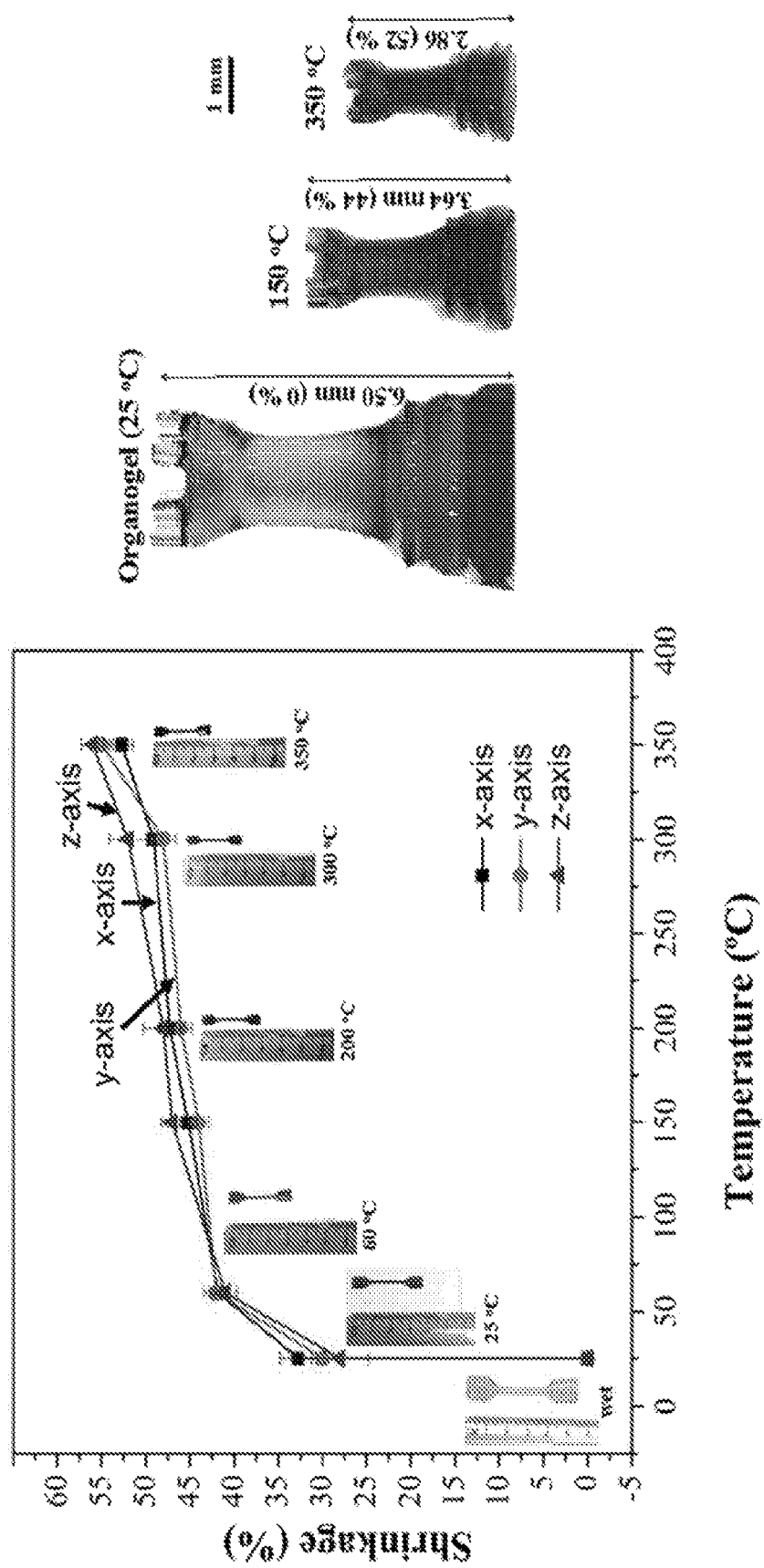

FIG. 18 is a graph of the dimensional shrinkage (%) along the x, y, and z axes as a function of postprocessing temperature. The value for shrinkage (%) at a particular temperature is the ratio of dimensional change along one axis compared to the solvated 3D-printed tensile coupon. The shrinkage is independent of the 3D object shape and size. Images of 3D-printed tensile specimens heated at different temperatures are included. Anisotropic 3D-printed structures also exhibit isotropic shrinkage when thermally imidized after solvent removal The observed 52% isotropic shrinkage upon complete imidization is independent of the 3D object shape and size. Additionally, shrinkage values and imidization content at imidization isotherms ranging from 30 to 180 min did not affect mechanical properties or shrinkage values.

Figure 19:
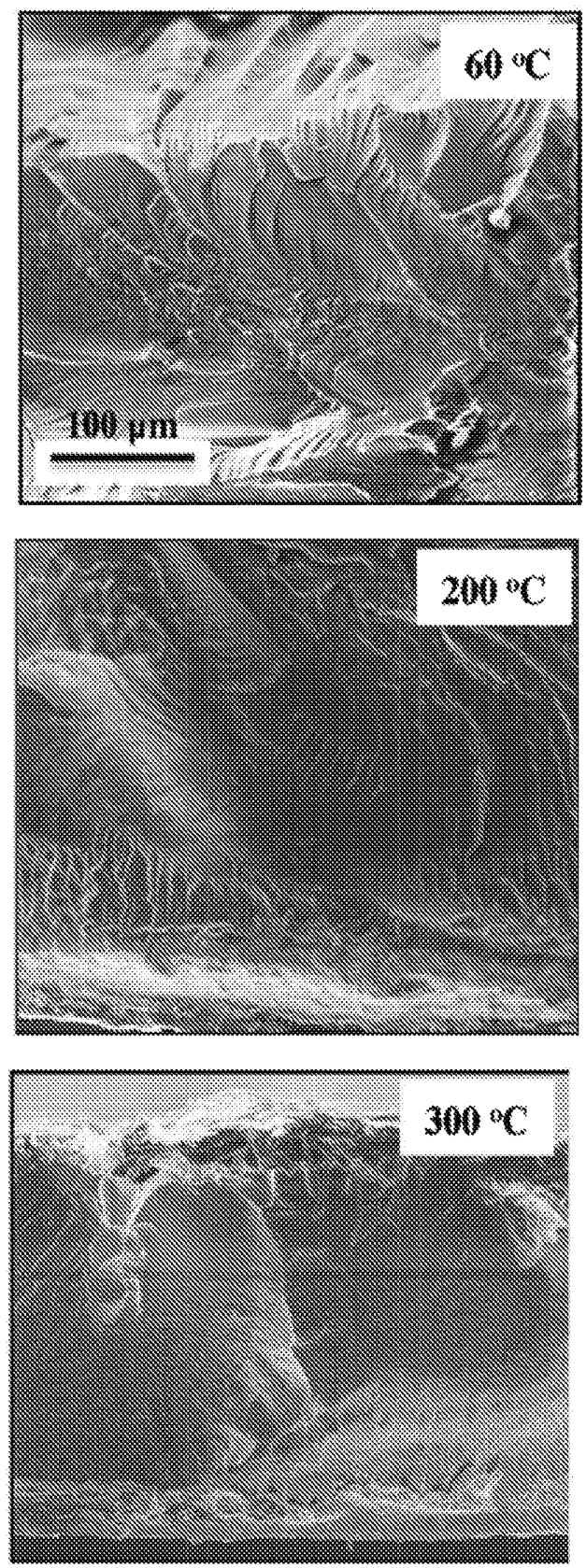

FIG. 19 is a set of SEM cross sections of 3D parts fractured in liquid nitrogen. The scale bar for all microscopy images is the same, and is shown in the left image. Cross sections were imaged after thermally postprocessing the samples up to 60, 200, and 300° C. for 1 h each for the left, center, and right images respectively. Layers are not visible. Surface features such as ridges and troughs that run the entire length of the cross section are also an indirect evidence for the absence of layers.

Figure 20A:
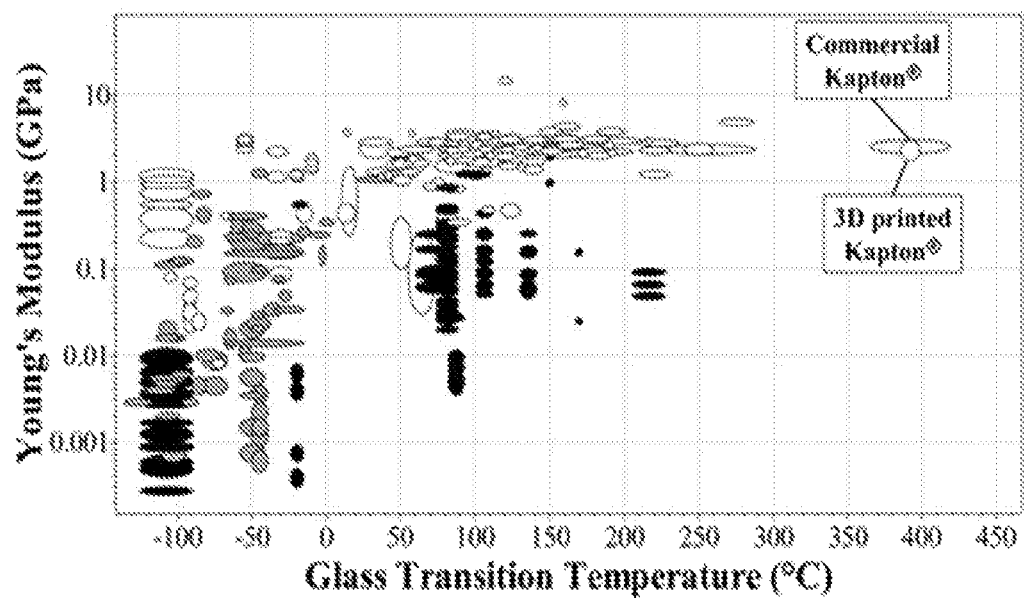
Figure 20B:
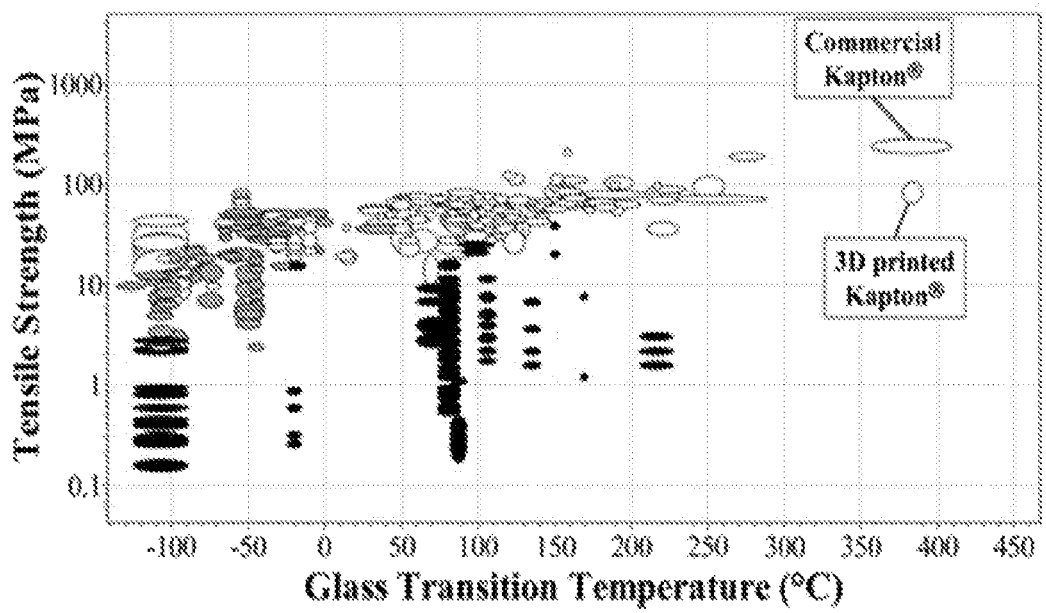

FIGS. 20A-20B are Ashby plots of thermoplastics with Young's modulus (FIG. 20A) and tensile strength (FIG. 20B) as a function of glass transition temperature reveal the mechanical properties of plastics (white), elastomeric thermoplastics (grey), and thermoplastic foams (black). Typical 3D-printed polymers exhibit mechanical properties that lie within the colored regions. Commercial Kapton is also included in the Ashby plot for comparison.

DETAILED DESCRIPTION

In various aspects, compositions for additive manufacturing and 3D printing are provided, e.g. polymeric resin compositions suitable for the stereolithographic printing of conjugated thermoplastics. Methods of making the compositions and methods of additive manufacturing using these compositions are also provided. Articles are provided prepared from the additive manufacturing methods and compositions described herein. In some aspects, the compositions have an overall greater resolution than similar structures made of the same polymers prepared by conventional methods such as thermoplastic molding.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "alkyl" refers to the radical of saturated aliphatic groups, including straight-chain alkyl groups, branched-chain alkyl groups, cycloalkyl (alicyclic) groups, alkyl-substituted cycloalkyl groups, and cycloalkyl-substituted alkyl groups.

In some embodiments, a straight chain or branched chain alkyl has 30 or fewer carbon atoms in its backbone (e.g., $C_1$-$C_{30}$ for straight chains, $C_3$-$C_{30}$ for branched chains), 20 or fewer, 12 or fewer, or 7 or fewer. Likewise, in some embodiments cycloalkyls have from 3-10 carbon atoms in their ring structure, e.g. have 5, 6 or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, a hosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, or from one to six carbon atoms in its backbone structure. Likewise, "lower alkenyl" and "lower alkynyl" have similar chain lengths. Throughout the application, preferred alkyl groups are lower alkyls. In some embodiments, a substituent designated herein as alkyl is a lower alkyl It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In some embodiments, the "alkylthio" moiety is represented by one of —S— alkyl, —S-alkenyl, and —S-alkynyl. Representative alkylthio groups include methylthio, and ethylthio. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

The terms "alkoxyl" or "alkoxy" as used herein refers to an alkyl group, as defined above, having an oxygen radical attached thereto. Representative alkoxyl groups include methoxy, ethoxy, propyloxy, and tert-butoxy. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O— alkynyl. Aroxy can be represented by —O-aryl or O-heteroaryl, wherein aryl and heteroaryl are as defined below. The alkoxy and aroxy groups can be substituted as described above for alkyl.

The terms "amine" and "amino" are art-recognized and refer to both unsubstituted and substituted amines, e.g., a moiety that can be represented by the general formula:

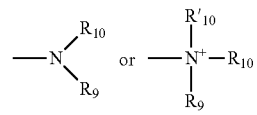

wherein $R_9$, $R_{10}$, and $R'_{10}$ each independently represent a hydrogen, an alkyl, an alkenyl, —$(CH_2)_m$—$R_8$ or $R_9$ and $R_{10}$ taken together with the N atom to which they are attached complete a heterocycle having from 4 to 8 atoms in the ring structure; $R_8$ represents an aryl, a cycloalkyl, a cycloalkenyl, a heterocycle or a polycycle; and m is zero or an integer in the range of 1 to 8. In some embodiments, only one of $R_9$ or $R_{10}$ can be a carbonyl, e.g., $R_9$, $R_{10}$ and the nitrogen together do not form an imide. In still other embodiments, the term "amine" does not encompass amides, e.g., wherein one of $R_9$ and $R_{10}$ represents a carbonyl. In additional embodiments, $R_9$ and $R_{10}$ (and optionally $R'_{10}$) each independently represent a hydrogen, an alkyl or cycloakly, an alkenyl or cycloalkenyl, or alkynyl. Thus, the term "alkylamine" as used herein means an amine group, as defined above, having a substituted (as described above for alkyl) or unsubstituted alkyl attached thereto, i.e., at least one of $R_9$ and $R_{10}$ is an alkyl group.

The term "amido" is art-recognized as an amino-substituted carbonyl and includes a moiety that can be represented by the general formula:

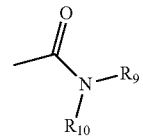

wherein $R_9$ and $R_{10}$ are as defined above.

"Aryl", as used herein, refers to $C_5$-$C_{10}$-membered aromatic, heterocyclic, fused aromatic, fused heterocyclic, biaromatic, or bihetereocyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN; and combinations thereof.

The term "aryl" also includes polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. One or more of the rings can be substituted as defined above for "aryl".

The term "aralkyl", as used herein, refers to an alkyl group substituted with an aryl group (e.g., an aromatic or heteroaromatic group).

The term "carbocycle", as used herein, refers to an aromatic or non-aromatic ring in which each atom of the ring is carbon.

"Heterocycle" or "heterocyclic", as used herein, refers to a cyclic radical attached via a ring carbon or nitrogen of a monocyclic or bicyclic ring containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, (C$_1$-C$_{10}$) alkyl, phenyl or benzyl, and optionally containing 1-3 double bonds and optionally substituted with one or more substituents. Examples of heterocyclic ring include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. Heterocyclic groups can optionally be substituted with one or more substituents at one or more positions as defined above for alkyl and aryl, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —CF3, and —CN.

The term "carbonyl" is art-recognized and includes such moieties as can be represented by the general formula:

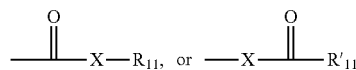

wherein X is a bond or represents an oxygen or a sulfur, and R$_{11}$ represents a hydrogen, an alkyl, a cycloalkyl, an alkenyl, an cycloalkenyl, or an alkynyl, R'$_{11}$ represents a hydrogen, an alkyl, a cycloalkyl, an alkenyl, an cycloalkenyl, or an alkynyl. Where X is an oxygen and R$_{11}$ or R'$_{11}$ is not hydrogen, the formula represents an "ester". Where X is an oxygen and R$_{11}$ is as defined above, the moiety is referred to herein as a carboxyl group, and particularly when R$_{11}$ is a hydrogen, the formula represents a "carboxylic acid". Where X is an oxygen and R'$_{11}$ is hydrogen, the formula represents a "formate". In general, where the oxygen atom of the above formula is replaced by sulfur, the formula represents a "thiocarbonyl" group. Where X is a sulfur and R$_{11}$ or R'$_{11}$ is not hydrogen, the formula represents a "thioester." Where X is a sulfur and R$_{11}$ is hydrogen, the formula represents a "thiocarboxylic acid." Where X is a sulfur and R'$_{11}$ is hydrogen, the formula represents a "thioformate." On the other hand, where X is a bond, and R$_{11}$ is not hydrogen, the above formula represents a "ketone" group. Where X is a bond, and R$_{11}$ is hydrogen, the above formula represents an "aldehyde" group.

The term "monoester" as used herein refers to an analogue of a dicarboxylic acid wherein one of the carboxylic acids is functionalized as an ester and the other carboxylic acid is a free carboxylic acid or salt of a carboxylic acid. Examples of monoesters include, but are not limited to, to monoesters of succinic acid, glutaric acid, adipic acid, suberic acid, sebacic acid, azelaic acid, oxalic and maleic acid.

The term "heteroatom" as used herein means an atom of any element other than carbon or hydrogen. Examples of heteroatoms are boron, nitrogen, oxygen, phosphorus, sulfur and selenium. Other heteroatoms include silicon and arsenic.

As used herein, the term "nitro" means —NO$_2$; the term "halogen" designates —F, —Cl, —Br or —I; the term "sulfhydryl" means —SH; the term "hydroxyl" means —OH; and the term "sulfonyl" means —SO$_2$—.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, aminoacid, peptide, and polypeptide groups.

Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e. a compound that does not spontaneously undergo transformation such as by rearrangement, cyclization, elimination, etc.

In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. The heteroatoms such as nitrogen may have hydrogen substituents and/or any permissible substituents of organic compounds described herein which satisfy the valencies of the heteroatoms.

In various aspects, the substituent is selected from alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide, and thioketone, each of which optionally is substituted with one or more suitable substituents. In some embodiments, the substituent is selected from alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone, wherein each of the alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone can be further substituted with one or more suitable substituents.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, thioketone, ester, heterocyclyl, —CN, aryl, aryloxy, perhaloalkoxy, aralkoxy, heteroaryl, heteroaryloxy, heteroarylalkyl, heteroaralkoxy, azido, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like. In some embodiments, the substituent is selected from cyano, halogen, hydroxyl, and nitro.

The term "copolymer" as used herein, generally refers to a single polymeric material that is comprised of two or more different monomers. The copolymer can be of any form, such as random, block, graft, etc. The copolymers can have any end-group, including capped or acid end groups.

The terms "mean particle size" and "average particle size," as used interchangeably herein, generally refer to the statistical mean particle size (diameter) of the particles in the composition.

The terms "mean pore size" and "average pore size," as used interchangeably herein, generally refer to the statistical mean pore size (diameter) of the pores in a porous material.

The terms "monodisperse" and "homogeneous size distribution", as used interchangeably herein, describe a population of particles or pores all having the same or nearly the same size. As used herein, a monodisperse distribution refers to distributions in which 90% of the particles or pores in the distribution have a size that lies within 5% of the mean size for the distribution.

As used herein, the term "linker" refers to a carbon chain that can contain heteroatoms (e.g., nitrogen, oxygen, sulfur, etc.) and which may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 atoms long. Linkers may be substituted with various substituents including, but not limited to, hydrogen atoms, alkyl, alkenyl, alkynl, amino, alkylamino, dialkylamino, trialkylamino, hydroxyl, alkoxy, halogen, aryl, heterocyclic, aromatic heterocyclic, cyano, amide, carbamoyl, carboxylic acid, ester, thioether, alkylthioether, thiol, and ureido groups. Those of skill in the art will recognize that each of these groups may in turn be substituted. Examples of linkers include, but are not limited to, pH-sensitive linkers, protease cleavable peptide linkers, nuclease sensitive nucleic acid linkers, lipase sensitive lipid linkers, glycosidase sensitive carbohydrate linkers, hypoxia sensitive linkers, photo-cleavable linkers, heat-labile linkers, enzyme cleavable linkers (e.g., esterase cleavable linker), ultrasound-sensitive linkers, and x-ray cleavable linkers.

Polymer Resins

A variety of compositions are provided suitable for additive manufacturing, e.g. stereolithographic printing, resin printing, 3D printing, or vat photopolymerization as the terms are used essentially interchangeably herein. In particular a variety of polymeric resins are provided suitable for the stereolithographic printing of thermoplastics, e.g. aromatic and insoluble thermoplastics with exceptional thermal stability and mechanical properties.

In some aspects, a polymer resin for vat photopolymerization is provided including a polyamic diacrylate ester or salt thereof, the polyamic diacrylate ester or salt comprising a plurality of photocrosslinkable groups pendantly attached thereto; a photoinitiator suitable for initiating crosslinking of the photocrosslinkable groups when exposed to a light source of a suitable wavelength and intensity; and a suitable organic solvent.

In some aspects, a polymer resin is provided for vat photopolymerization. The polymer resin can include a polyamic diacrylate ester or salt thereof, the polyamic diacrylate ester or salt comprising a plurality of photocrosslinkable groups pendantly attached thereto; a photoinitiator suitable for initiating crosslinking of the photocrosslinkable groups when exposed to a light source of a suitable wavelength and intensity; and a suitable organic solvent. In some aspects, the polyamic diacrylate ester or salt thereof has a number average molecular weight of about 20000 g/mol to about 100000 g/mol, about 20000 g/mol to about 80000 g/mol, about 40000 g/mol to about 80000 g/mol, about 40000 g/mol to about 60000 g/mol, about 20000 g/mol to about 60000 g/mol, or about 30000 g/mol to about 70000 g/mol.

In some aspects, the polyamic diacrylate ester or salt thereof has a polydispersity of about 3, about 2.5, about 2, about 1.8, about 1.6, or less. In some aspects, the photocrosslinkable groups have a thermal decomposition temperature of about 400° C., about 350° C., about 300° C., about 250° C., or less. In some aspects, the photocrosslinkable groups include an acrylate, a methacrylate, or a combination thereof. In some aspects, upon drying the resin and heating to a temperature of about 200° C. to 350° C. the polyamic diacrylate ester or salt thereof undergoes thermal imidization to form a polyimide. In some aspects, the polyamic diacrylate ester or salt thereof is present at an amount of about 5 wt % to about 50 wt %, about 5 wt % to about 40 wt %, about 10 wt % to about 40 wt %, about 10 wt % to about 50 wt %, about 20 wt % to about 40 wt %, or about 20 wt % to about 50 wt % based upon a total weight of the polymer resin.

In some aspects, polymer resins for vat photopolymerization are provided including (1) a photocrosslinkable precursor polymer with repeat units having a structure according to the following formula

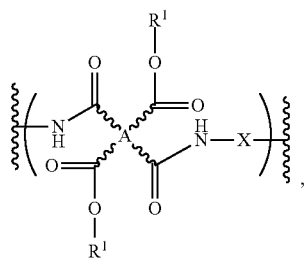

(2) a photointiator suitable for initiating crosslinking of the $R^1$ when exposed to a light source of a suitable wavelength and intensity; and (3) a suitable organic solvent.

In some aspects, polymer resins for vat photopolymerization are provided including (1) a photocrosslinkable precursor polymer with repeat units having a structure according to the following formula

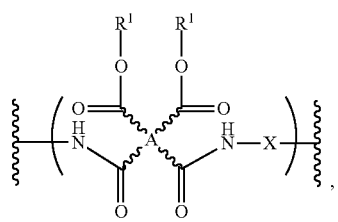

(2) a photointiator suitable for initiating crosslinking of the $R^1$ when exposed to a light source of a suitable wavelength and intensity; and (3) a suitable organic solvent.

In the above formulas, $R^1$ can have a structure according to the following formula

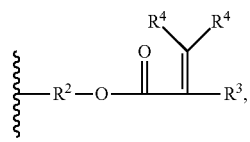

wherein each occurrence of $R^2$ is independently a linear or branched alkyl group having from 1 to 6 carbon atoms or from 2 to 5 carbon atoms, wherein each occurrence of $R^3$ is independently a hydrogen or a methyl, and wherein each occurrence of $R^4$ is independently a hydrogen, a linear alkyl group, or a branched alkyl group having from 1 to 12, 1 to 7, 1 to 6, 1 to 5, 1 to 4, 1 to 3, 1 to 2, 1, or 2 to 5 carbon atoms.

In the above formulas, each occurrence of X and A is independently a substituted or unsubstituted aromatic group. In some aspects, X is a substituted aromatic group having one or more hydroxy or methoxy substituents adjacent to the N substituent. In some aspects, of A is independently selected from the group of substituted and unsubstituted phenyl, substituted and unsubstituted biphenyl, substituted and unsubstituted diphenyl ether, substituted and unsubstituted benzophenone, substituted and unsubstituted (perfluoropropane-2,2-diyl)phenyl, substituted and unsubstituted propane-2,2-diylphenyl, sulfonyldiphenyl, and substituted and unsubstituted diphenylacetylene. In some aspects, A is independently selected from the group consisting of

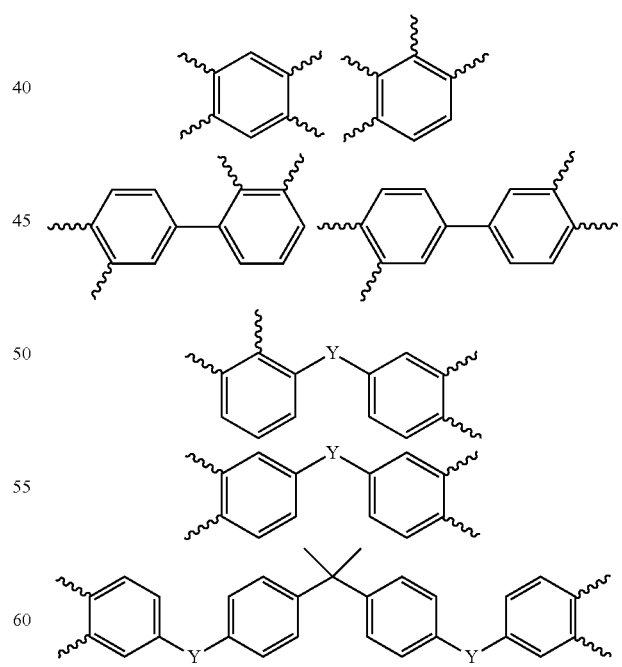

where Y is selected from the group consisting of O, S, C=O, $C(CF_3)_2$, $C(CH_3)_2$, $SO_2$, and C≡C.

The resins can include a suitable organic solvent. In some aspects, the solvent can include of N-methyl-2-pyrrolidone (NMP), dimethylacetamide (DMAC), dimethylformamide (DMF), or mixtures thereof.

N some aspects, the photointiator is a phosphine oxide such as phenylbis(2,4,6-trimethylbenzoyl)phosphine. The suitable wavelength can include, for example about 300 nm to 500 nm, about 350 nm to 500 nm, about 350 nm to 450 nm, or about 300 nm to 450 nm. In some instances, the photoinitiator is present in an amount from about 1.5 wt % to about 5 wt % based upon a total weight of the polymer resin.

A variety of photocrosslinkable precursor polymers suitable for carrying out the printing methods are described herein. In some aspects, the photocrosslinkable precursor polymer includes repeat units having a structure according to one of the following formulas

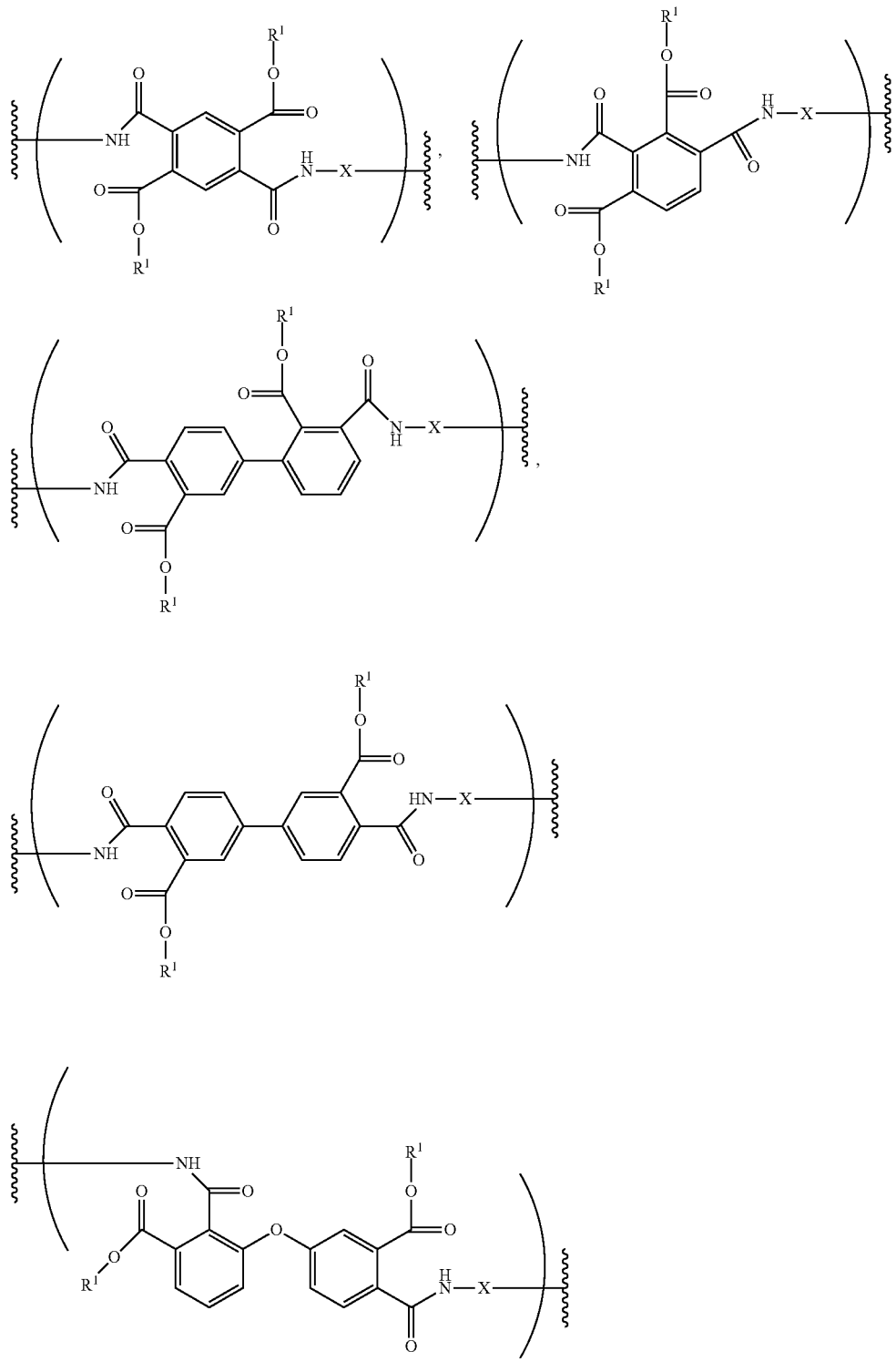

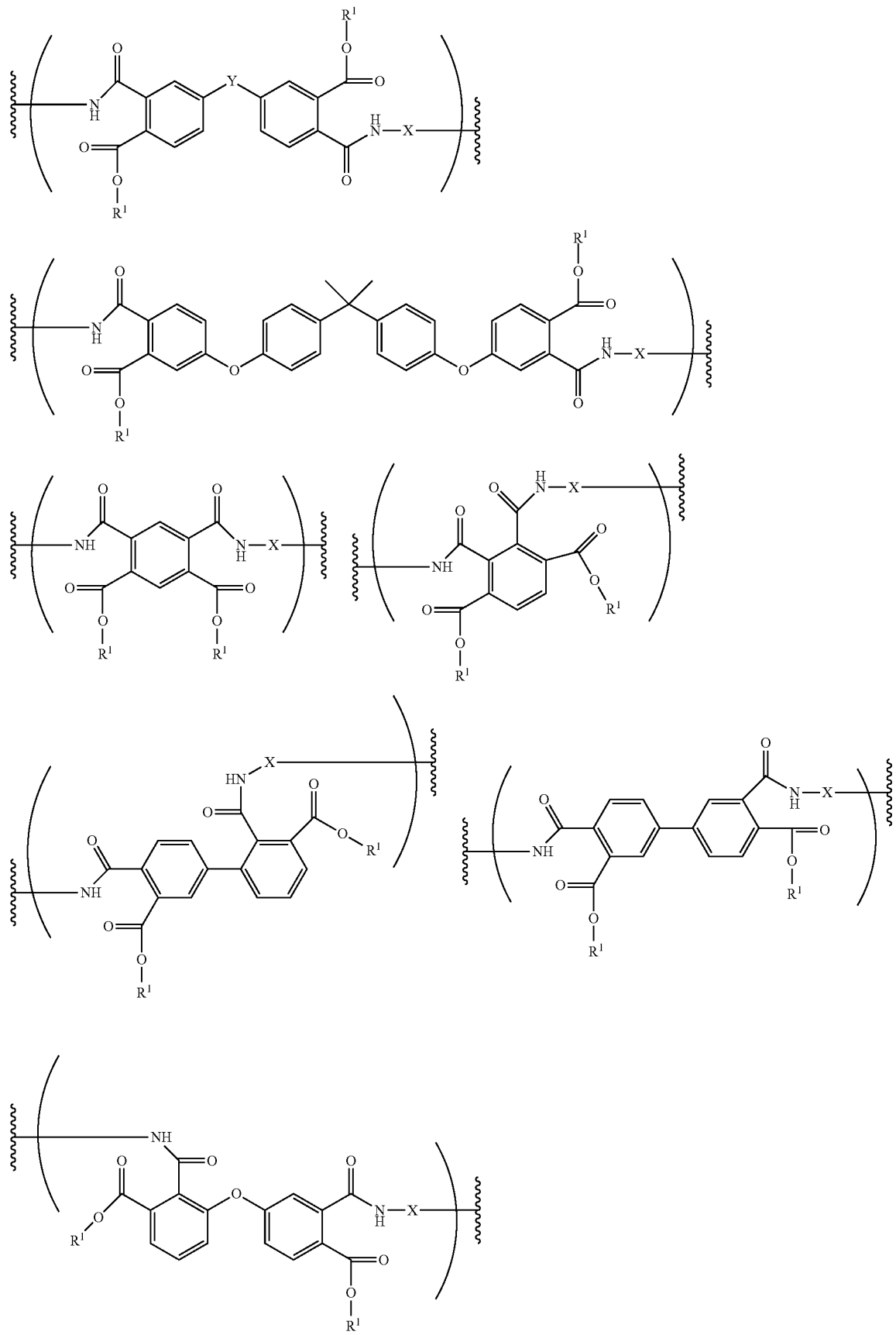

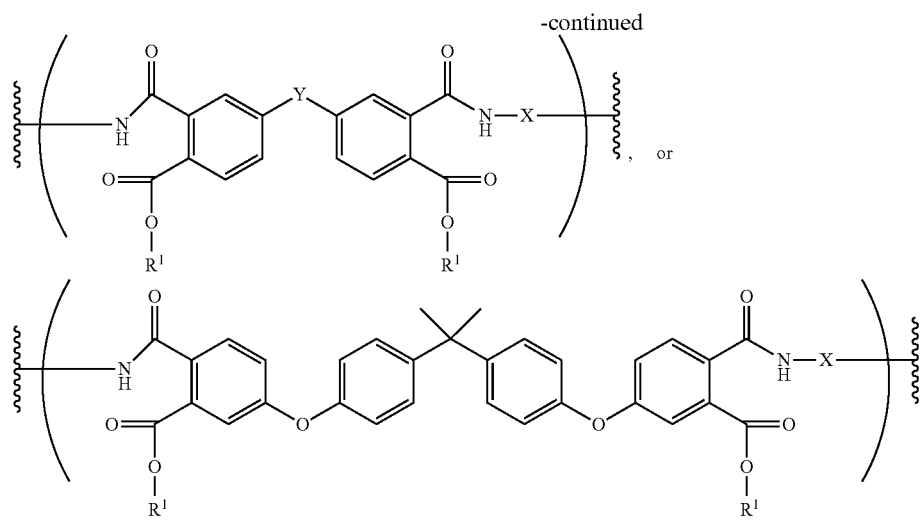

In some aspects, X in the above formulas can include w substituted and unsubstituted phenyl, substituted and unsubstituted biphenyl, substituted and unsubstituted, substituted and unsubstituted diphenyl ether, substituted and unsubstituted benzophenone, substituted and unsubstituted (perfluoropropane-2,2-diyl)phenyl, substituted and unsubstituted propane-2,2-diylphenyl, sulfonyldiphenyl, substituted and unsubstituted fluorene, substituted and unsubstituted naphthyl, or substituted and unsubstituted pyrene. In some instances, X is selected from the group consisting of

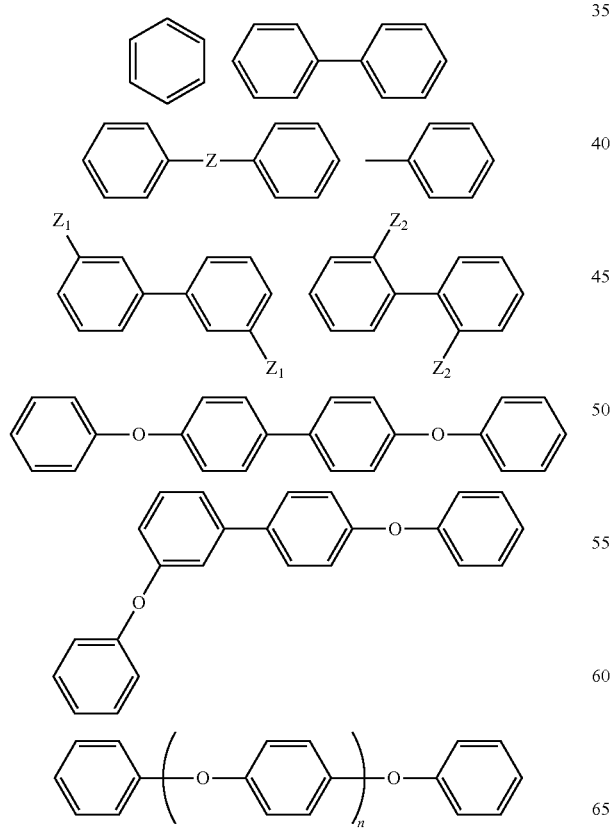

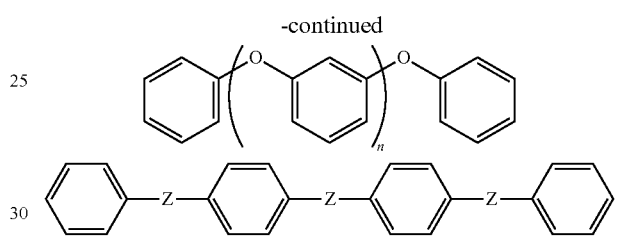

where each occurrence of Z is independently O, $CH_2$, $CH_2CH_2$, $SO_2$, $C(CF_3)_2$, $C(CH_3)_2$, S, S—S, CH=CH, C=O, C≡C, or NH; where each occurrence of $Z_1$ is independently H, Cl, OH, $OCH_3$, $CH_3$, or $CH_2CH_3$; where each occurrence of $Z_2$ is independently H, $CH_3$, $CF_3$, or $SO_3H$; and where each occurrence of n is independently 0, 1, 2, or 3.

In some aspects, the photocrosslinkable precursor polymer has a structure according to the following formula

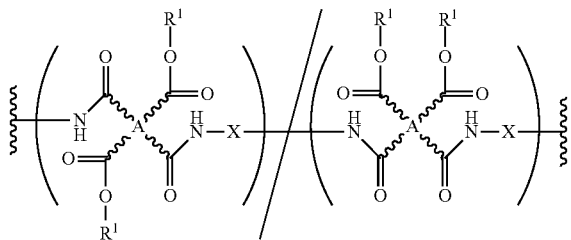

where A, X, and $R^1$ are as described above.

The resins can also include a suitable UV blocker. For example, the UV blocker can include UV blockers such as benzophenones, benzotriazoles, diazines and triazines, benzoates, oxalanilide, azobenzones, metal oxides (zinc oxide, titanium dioxide). In some aspects, the UV blocker is present in an amount from 0.1% to 3% by weight based upon the total weight of the polymer resin. In some aspects, the UV blocker is present in an amount from 0% to 3% by weight based upon the total weight of the polymer resin. Examples of UV blockers can include 4-nitrophenol, 2,5-Bis(5-tert-butyl-benzoxazol-2-yl)thiophene, 2-hydroxy-4-methoxy benzophenone, 1-(4-Methoxyphenyl)-3-(4-tert-butylphenyl) propane-1,3-dione, disodium 2,2'-(1,4-phenylene)bis(6-sulfo-1H-benzimidazole-4-sulfonate), Hexyl 2-[4-(diethylamino)-2-hydroxybenzoyl]benzoate, Menthyl-o-aminobenzoate, 2,2'-[6-(4-methoxyphenyl)-1,3,5-triazine-2,4-diyl] bis{5-[(2-ethylhexyl)oxy]phenol}, 2,4-dihydroxybenzophenone, 2,2',4,4'-tetrahydroxybenzophenone, 4-Hydroxy-2-methoxy-5-(oxophenylmethyl)benzenesulfonic acid, 2,2'-dihydroxy-4,4'-dimethoxybenzophenone, 5-chloro-2-hydroxybenzophenone, (2-Hydroxy-4-methoxyphenyl)-(2-hydroxyphenyl)methanone, sodium 2,2'-dihydroxy-4,4'-dimethoxybenzophenone-5,5'-disulfonate, (2-Hydroxy-4-methoxyphenyl) (4-methylphenyl) methanone, "(2-hydroxy-4-octoxy-phenyl)-phenyl-methanone, 2-(1,2,3-Benzotriazol-2-yl)-4-methyl-6-[2-methyl-3-(2,2,4,6,6-pentamethyl-3,5-dioxa-2,4,6-trisilaheptan-4-yl)propyl] phenol, Terephthalylidene dicamphor sulfonic acid, 2-ethylhexyl 2-cyano-3,3-diphenyl-2-propenoate, Diethylhexyl butamido triazone, 2-Ethoxyethyl 3-(4-methoxyphenyl)propenoate, Isopentyl 4-methoxycinnamate, 2,2'-methanediylbis[6-(2H-benzotriazol-2-yl)-4-(2,4,4-trimethylpentan-2-yl)phenol], 2-(2H-Benzotriazol-2-yl)-4-(1,1,3,3-tetramethylbutyl)phenol, 2,2'-Methylenebis[6-(2H-benzotriazol-2-yl)-4-(1,1,3,3-tetramethylbutyl)phenol], 2-Hydroxy-4-(octyloxy)benzophenone, 2-ethyl-, 2-[4-(4,6-diphenyl-1,3,5-triazin-2-yl)-3-hydroxyphenoxy]ethyl ester, 2-tert-Butyl-6-(5-chloro-2H-benzotriazol-2-yl)-4-methylphenol, 2-(2-Hydroxy-5-methylphenyl)benzotriazole, 2,4-dinitrophenylhydrazine, N-(4-ethoxycarbonylphenyl)-N'-methyl-N'-phenylformamidine, Hexadecyl 3,5-bis-tert-butyl-4-hydroxybenzoate, and 2-Ethyl-2'-ethoxyoxalanilide.

The resins can be used to print polyimide polymers. In some aspects, the polyimide has a thermal decomposition temperature of about 500° C. to about 700° C. In some aspects, the polyimide has a thermal decomposition temperature that is at least 150° C. higher than a thermal decomposition temperature of the photocrosslinkable groups.

Methods of Making Polymer Resins

Methods of making the polymer resins are also provided. The methods can include, for example, ring opening of an aromatic dianhydride with an alcohol containing an acrylate or methacrylate to produce a photocrosslinkable diacid monomer; conversion of the photocrosslinkable diacid monomer to a photocrosslinkable diacyl chloride; polymerization of the photocrosslinkable diacyl chloride with an aromatic diamine to produce a photocrosslinkable precursor polymer; and dissolving a photointiator and the photocrosslinkable precursor polymer in a suitable organic solvent.

In some aspects, the dianhydride has a structure such as

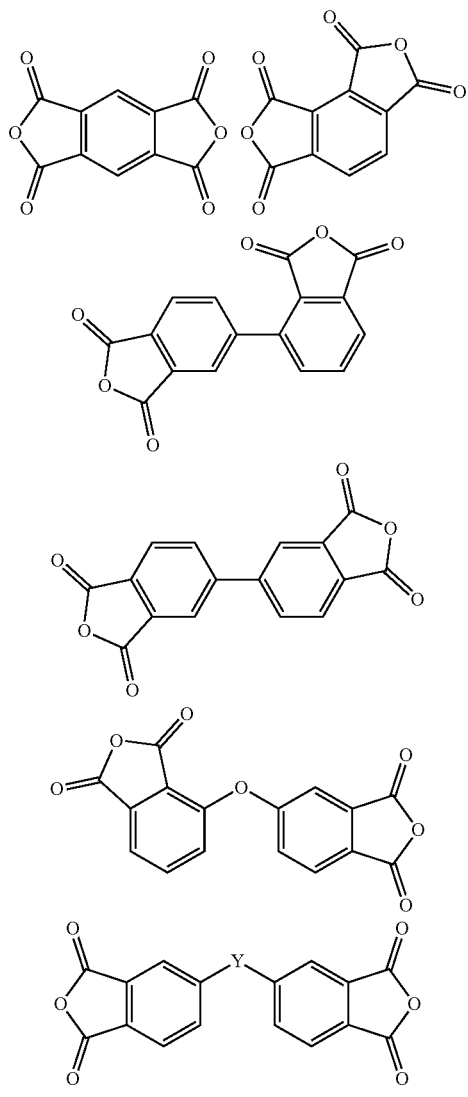

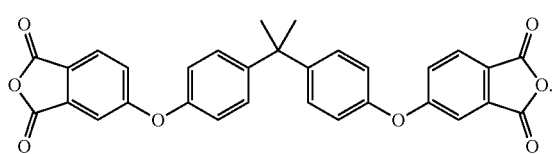

In some aspects, the alcohol has a structure according to the following,

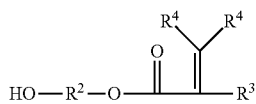

where R2, R3, and R4 are as described above.

In some aspects, the aromatic diamine is an aromatic group having two amine substituents attached thereto, wherein the aromatic group is selected from

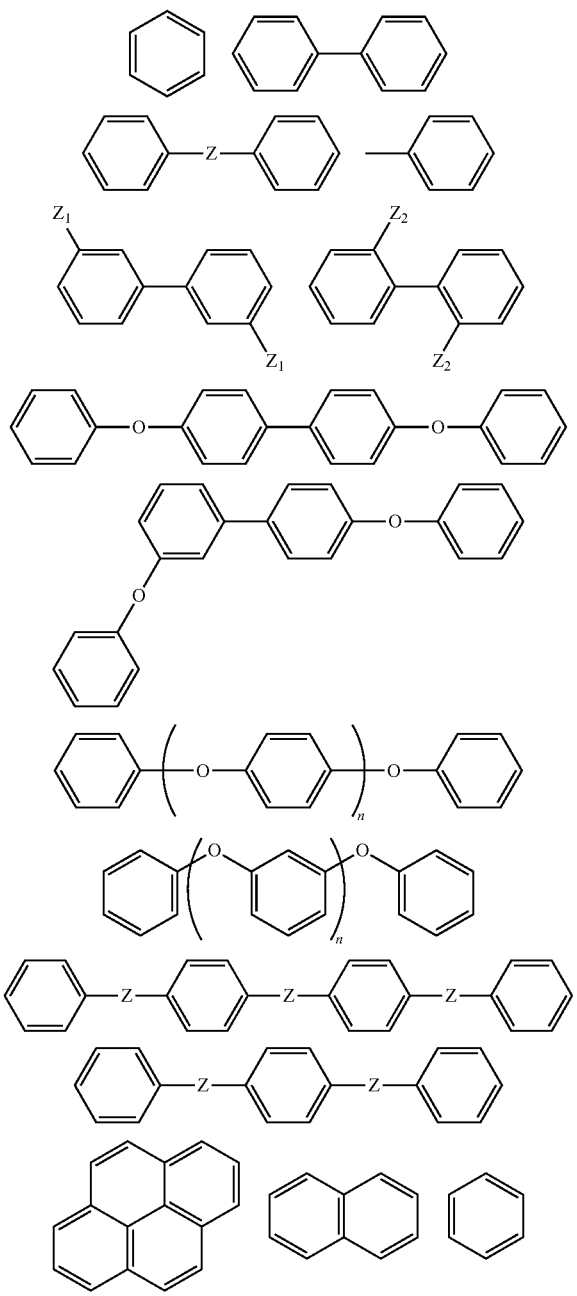

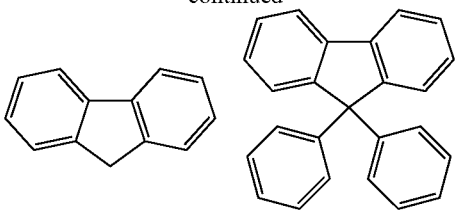

where the aromatic group comprises two amine substituents attached thereto, where each occurrence of Z is independently O, $CH_2$, $CH_2CH_2$, $SO_2$, $C(CF_3)_2$, $C(CH_3)_2$, S, S—S, CH=CH, C=O, C≡C, or NH; where each occurrence of $Z_1$ is independently H, Cl, OH, $OCH_3$, $CH_3$, or $CH_2CH_3$; where each occurrence of $Z_2$ is independently H, $CH_3$, $CF_3$, or $SO_3H$; and where each occurrence of n is independently 0, 1, 2, or 3.

Methods of Additive Manufacturing With Polymer Resins

Methods of making articles are provided, e.g. by stereolithographic or other vat photopolymerization methods. In some instances, the methods include (a) applying an effective amount of a light to a solution including a photocrosslinkable precursor polymer to crosslink the photocrosslinkable precursor polymer to form a layer of a precursor article, wherein the photocrosslinkable precursor polymer includes repeat units having a structure according to the following formula

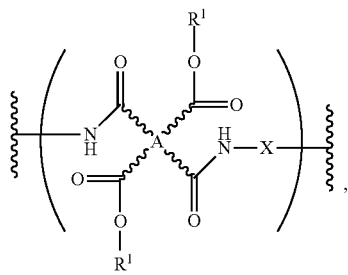

(b) repeating step (a) a number of times to form the precursor article in a layer-by-layer fashion; and (c) heating the precursor article to a first elevated temperature for a period of time to form the article including polyimide repeat units having a structure according to the following formula

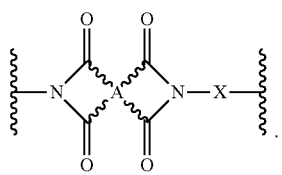

A, X, and $R^1$ can be as described above.

In some instances, the methods include (a) applying an effective amount of a light to a solution comprising a photocrosslinkable precursor polymer to crosslink the photocrosslinkable precursor polymer to form a layer of a precursor article, wherein the photocrosslinkable precursor polymer comprises repeat units having a structure according to the following formula

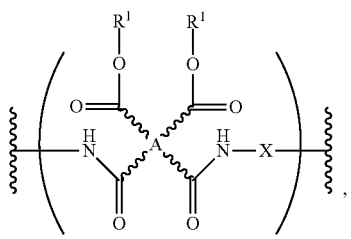

(b) repeating step (a) a number of times to form the precursor article in a layer-by-layer fashion; and (c) heating the precursor article to a first elevated temperature for a period of time to form the article comprising polyimide repeat units having a structure according to the following formula

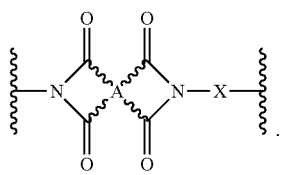

A, X, and $R^1$ can be as described above.

In some aspects, the methods include (a) applying an effective amount of a light to a solution comprising a photocrosslinkable precursor polymer to crosslink the photocrosslinkable precursor polymer to form a layer of a precursor article, wherein the photocrosslinkable precursor polymer comprises repeat units having a structure according to the following formula

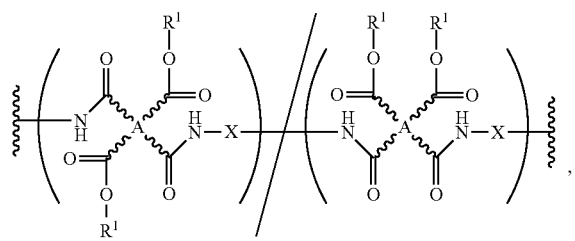

(b) repeating step (a) a number of times to form the precursor article in a layer-by-layer fashion; and (c) heating the precursor article to a first elevated temperature for a period of time to form the article comprising polyimide repeat units having a structure according to the following formula

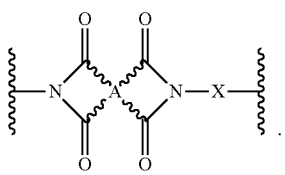

A, X, and $R^1$ can be as described above.

In some aspects, X is an aromatic group having one or more hydroxy or methoxy substituents adjacent to the amine substituent, and wherein the method further includes (d) heating the article to a second elevated temperature for a second period of time to convert at least some of the polyimide repeat units into polybenzoxazole repeat units having a structure according to the following formula

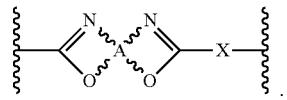

In some aspects, the methods include drying the precursor article to remove the solvent prior to forming the polyimide repeat units. For example, the drying can be performed by drying the precursor article in a vacuum oven for about 1 h. at one or more temperatures between 25° C. and 150° C. The article, after imidization and drying, can be essentially devoide of the layered structure, i.e. the article does not comprise a layered structure.

Articles Made by Additive Manufacturing with Polymer Resins

Articles of manufacture prepared from the resins and methods described herein are also provided. The articles can include any article capable of being printed using stereolithographic techniques, such as thermal insulation panels for airplanes, spacecraft, satellites, and space suits, heat exchangers, bushings, bearings, sockets or constructive parts for automobiles and aerospace and automobile industry, gas permeation membranes, and gas separation membranes, and the like.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: 3D Printing all-Aromatic Polyimides Using Mask-Projection Stereolithography This example demonstrates the 3D printing of pyromellitic dianhydride and 4,4'-oxydianiline (PMDA-ODA) (Kapton) using maskprojection stereolithography, and the preparation of high-resolution 3D structures without sacrificing bulk material properties. Synthesis of a soluble precursor polymer containing photo-crosslinkable acrylate groups enables light-induced, chemical crosslinking for spatial control in the gel state. Postprinting thermal treatment transforms the crosslinked precursor polymer to PMDA-ODA. The dimensional shrinkage is isotropic, and postprocessing preserves geometric integrity. Furthermore, large-area mask-projection scanning stereolithography demonstrates the scalability of 3D structures. These unique high-performance 3D structures offer potential in fields ranging from water filtration and gas separation to automotive and aerospace technologies.

Materials

99% Pyromellitic dianhydride (PMDA), hydroxyethyl acrylate (HEA), 99% 4,4'-oxydianiline (ODA), 99% oxalyl chloride and 97% phenylbis(2,4,6-trimethylbenzoyl)phosphine oxide were purchased from Sigma-Aldrich. Ultra-dry N-methyl pyrrolidinone was purchased from Fisher Scientific. HPLC grade Tetrahydrofuran (THF) and diethylether containing BHT was purchased from Fisher Scientific.

Techniques $^1$H nuclear magnetic resonance ($^1$H NMR) spectroscopy was performed using a Varian Unity 400 MHz spectrometer with CDCl$_3$ at 25° C. Size exclusion chromatography (SEC) analysis was performed using a Waters 5515 isocratic HPLC pump, Waters 717plus autosampler, Wyatt light scattering detector and a Waters 2414 refractive index detector set at 50° C. A total of 3 linear Styragel columns connected in series at a temperature of 50° C. were used for the separation. The eluent utilized was HPLC grade DMF filtered over P$_2$O$_5$. A total of 9 Shodex polystyrene standards were used to generate a calibration curve. All measurements were performed at a constant flow rate of 0.8 mL/min. UV-Vis spectroscopy was performed on 0.3 mg/mL solutions in quartz cuvettes (10 mm path length) in the 300-500 nm wavelength range using a Agilent single beam spectrophotometer.

The photocrosslinking kinetics and extent of PADE-NMP solutions was investigated using a PhotoDSC Q2000 from TA instruments coupled with Omnicure S2000 photoaccessory (320-5000 nm) using a waveguide. The samples were equilibrated by an isothermal hold at 25° C. for 1 min and then subjected to photocrosslinking at an intensity of 250 mW/cm$^2$ for a period of 7 min. The intensity measurement was enabled by sensors embedded within the sample and reference sample platforms in the photoDSC. The light guide height was adjusted to balance the light intensities for sample and reference cells. In a photoDSC the weight of the sample correlates with the sample thickness and hence cure depth effects can become prominent. To enable ideal comparison with the 3D printing, 10-15 mg samples in photoDSC resulted in crosslinked films having 80-130 μm thickness. This corroborates well with 3D printing layer thickness. All exotherms are normalized to the polymer weight in the solutions since NMP does not participate in the crosslinking.

Photorheology of the solutions were performed in air using a TA Instruments DHR-2 rheometer equipped with an Omnicure S2000 photoaccessory (320-500 nm), Smart Swap™ UV geometry and 20 mm quartz parallel plate. The samples were subjected to 1% oscillatory strain. The gap distance was set to 100 μm. The samples were equilibrated for a period of 3 min. with the axial force set to 0 N at an intensity of 250 mW/cm$^2$. The intensity was measured over the entire quartz plate using a Silverline radiometer with a 20 mm sensor attachment for the quartz plate. Thermogravimetric analysis (TGA) was performed using a TA Instruments TGA 2950 in N$_2$ atmosphere. ~5 mg PMDA-ODA was heated to 600° C. at 10° C./min. TGA-FTIR studies were performed using 10 mg of freshly 3D printed PADE. After an isothermal hold at 25° C. for 1 h, the temperature was ramped at 10° C./min to 100° C. The sample was maintained at 100° C. for 1 h. The temperature was further increased to 700° C. at 10° C./min. The evolved gases were analyzed using a Thermo-Fisher Nicolet iS-10 FTIR detector coupled to the TGA. The evolved gases were pumped from the TGA outlet to the FTIR using a Fisher Scientific Mini-Pump. The temperature of the tubing was maintained constant at 230° C. A background was collected before starting the sample run. Each measurement is the average of 6 scans that is performed at a resolution of 0.964 cm$^{-1}$.

The imide content was measured using a Varian 670-IR equipped with a Diamond ATR attachment. The spectral data was acquired at 4 cm$^{-1}$ resolution. A total of 32 scans were performed on each sample. The spectra were normalized using the C—C aromatic peak at 1495 cm$^{-1}$.

A Jeol NeoScope JCM-5000 SEM afforded images of the cross-sections of 3D printed tensile specimens. The tensile specimens were fractured after immersing in liquid N$_2$ for approximately 5 min. The fractured specimens were mounted onto the SEM sample stage and examined at different magnifications.

Dynamic mechanical analysis (DMA) was performed on a 3D printed bars with a TA Instruments DMA Q800 in oscillatory tension mode at 1 Hz and 3° C./min revealed storage modulus versus temperature behavior. Tensile testing was performed on an Instron 5500R tensile frame with a crosshead speed of 1.0 mm/min.

The mechanical properties were characterized using an Instron 4411 Universal Testing instrument on 3D printed ASTM type V dogbones. A cross-head speed of 1 mm/min at 25° C. The Young's modulus was calculated from the linear portion of the stress/strain curve. The reported tensile strength is the maximum tensile strength obtained. The average values reported are from tensile tests of at least 5 specimens.

Synthesis

PMDA-HEA (Para/Meta Isomers):

A 1 L single neck round bottomed flask was charged with 100 g of PMDA (0.458 mol), 111.8 g of HEA (0.963 mol) and 9.27 g of TEA (0.092 mol). The suspension was stirred under nitrogen for an hour and then refluxed for a period of 3 h.

The solution was cooled to ambient temperature and stirred overnight. The solution was poured into a 4 L beaker containing 600 mL of distilled water and stirred for 1 h. 2 L of diethyl ether was added and stirred for a further 1 h. The aqueous fraction was removed using a separation funnel. The organic layer was washed with 800 mL of 1M HCl, 1200 mL of water and 400 mL of brine. The organic layer was dried over MgSO$_4$ and the diethyl ether removed. The obtained white solid product containing 50:50 mixture of the para and meta isomers of PMDA-HEA were dried in vacuo at 40° C. overnight. The ratio of para and meta isomers was calculated from integration of the aromatic peaks in the NMR spectrum. Integration of the aromatic protons results in an isomeric molar ratio of 1:1 for the para and meta isomers. The overall yield was 90%. 1H NMR (400 MHz, DMSO-d6, δ): 8.08 (s, 1H), 7.98 (s, 2H), 7.87 (s, 1H), 6.34 (dd, 4H, J=17.3, 1.6 Hz), 6.16 (dd, 4H, J=17.3, 10.3 Hz), 5.93 (dd, 4H, J=10.3, 1.6 Hz), 4.38 (dd, 16H). IR (ATR crystal) (cm−1): ~3000 (broad) (vs, m, O—H), 1720 (v, s, C=O), 1640 (vs, w, vinyl C=C), 1495 (vs, s, benzyl C=C), 1410 (vb, s, vinyl C—H), 900 (vb, s, vinyl C—H).

PMDA-HEA Cl (Para/Meta Isomers):

A purged, oven dried 3-neck round-bottomed flask was charged with 50 g of PMDA-HEA (0.112 mol) and 150 mL of anhydrous dichloromethane. The reaction flask was connected to an acid scrubber. The mixture was stirred under inert atmosphere until all PMDA-HEA dissolved (~1 h). 5 drops of DMF were added as a catalyst. Using an addition funnel, 35.2 g (0.278 mol) of oxalyl chloride was added dropwise in 3 fractions. Upon addition of oxalyl chloride, bubbling and frothing was observed. Stirring was continued for an hour before resuming further addition of oxalyl chloride. During the addition of the 3rd fraction of oxalyl chloride, the solution was refluxed for a period of 3 h and then allowed to cool to room temperature slowly. Stirring was continued overnight. The DCM and excess oxalyl chloride were removed by distillation. The product, a yellowish viscous liquid was used without further purification. 1H NMR (400 MHz, CDCl$_3$, b): 8.38 (s, 1H), 8.18 (s, 2H), 7.98 (s, 1H), 6.47 (dd, 4H, J=17.3, 1.6 Hz), 6.19 (dd, 4H, J=17.3, 10.3 Hz), 5.93 (dd, 4H, J=17.3, 1.6 Hz), 4.63 (dd, 16H). 1H NMR peaks due to DMF are also observed.

Figure 2:
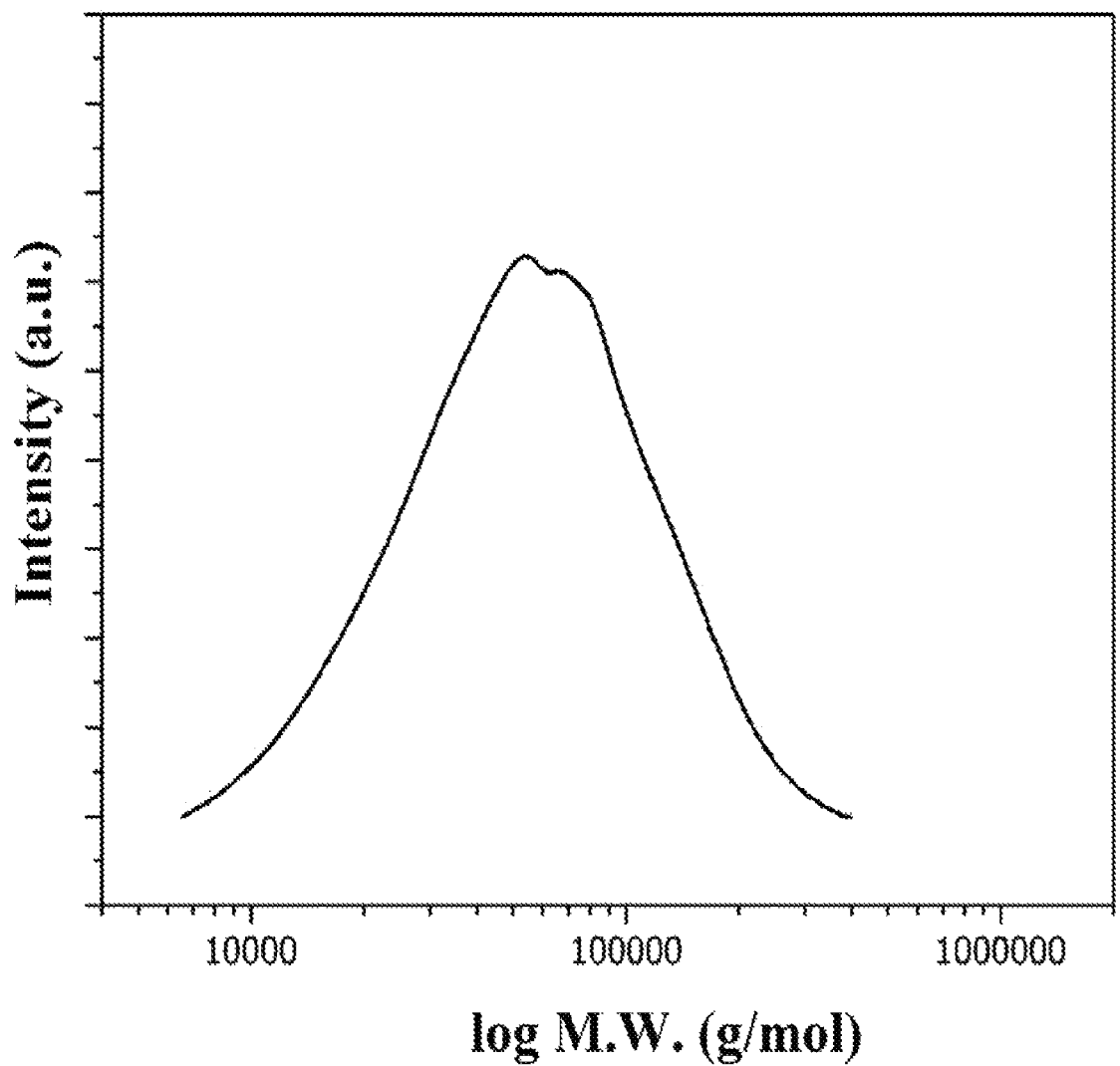
FIG. 2 is a graph of the intensity as a function of molecular weight of the synthesized PADE measured using size exclusion chromatography (SEC).

PADE:

A 3-neck round-bottomed flask was charged with 20.58 g (0.102 mol) of 4,4'-ODA and 250 mL NMP. The solution was stirred under N$_2$ for 30 min. The flask was immersed in an ice bath and cooled until the flask contents reached 0° C. 15.576 g (0.224 mol) of pyridine was added to the flask. In a second flask, 50 g (0.102 mol) of PMDA-HEACl was dissolved in 50 mL NMP. The flask contents were added to the ODA-NMP flask in one batch. Any remaining PMDA-HEA-Cl was washed down using 50 mL of NMP. The temperature was maintained at 0° C. for a period of 1 h. and then allowed to warm to 25° C. slowly. The reaction mixture was stirred for 24 h. The reaction content was precipitated in 1500 mL of methanol and stirred, any clumps were broken apart using a Warring blender. The washing was repeated a total of 3 times in methanol. The resulting powder was dried in a vacuum oven at 25° C. for 2 days. The molecular weight of the dried polymer was confirmed using SEC. SEC confirmed PADE molecular weight (Mn) of 49100 g/mol and polydispersity of 1.90 relative to polystyrene standards (see FIG. 2). For 3D printing, a total of 4 batches of PADE was utilized. The molecular weights attained for the different batches were reproducible.

PMDA-ODA prepared using the conventional 2-step method: A 2-neck round-bottomed flask was charged with 2.058 g (0.0102 mol) of 4,4'-ODA and 20 mL NMP. The solution was stirred under N$_2$ for 30 min. To this flask, 2.224 g (0.0102 mol) of PMDA was added in one batch. The viscous solution was stirred for 24 h. The polyamic acid formed was then cast on a glass plate using a doctor blade. The targeted film thickness is 50 µm. The cast film was placed in a vacuum oven and heated at 60° C. for 1.5 h to remove NMP. The thermal imidization was performed by heating the films at 100° C., 200° C. in vacuum for 1 h each. Once cooled to ~50° C., the glass plate was transferred to a N$_2$ furnace and heated at 300° C. and 350° C. for 1 h each. The glass plate was allowed to cool to 25° C. over 4 h and placed in a water bath to remove the PMDA-ODA film from the glass plate.

3D Printing and Post-Processing 3D printing of tensile specimens using MPSSL: The working curve was obtained by shining broad-spectrum UV-Vis light at 250 mW/cm$^2$ and measuring the cured film thickness at various exposure times. A dynamic moving mask was generated for the tensile specimens to cure layers with thickness of 150 µm. The tensile specimens were printed at a scan speed of 2.6 mm/s. A recoating step was performed between layers to ensure uniform layer thickness and homogeneity throughout the build volume. The final printed part was carefully removed from the glass slide and cleaned with 50:50 butyrolactone/acetone mixtures.

3D Printing Using Mask-Projection µSL

The MPµSL machine includes a UV light source, conditioning optics, a mirror, a dynamic mask connected to a computer, imaging optics, and a polymer container with a stage mounted on a linear actuator. A Blue Wave 75 UV Curing spot lamp with intensity adjustment from Dymax was chosen as a source of ultraviolet light. The conditioning optics (Edmund Optics) ensured that the entire dynamic mask is illuminated by UV-vis light while the imaging optics focused the patterned light onto the polymer surface. The dynamic mask included a DLP 0.65 1080p DMD from Texas Instruments with a 1920·1080 array of aluminum micromirrors. Each square micromirror has a side length of 7.56 µm. The imaging optics reduced the image dimensions by a factor of 2. The effective projection area of each micromirror on the surface of the photopolymer surface is 3.78 µm×3.78 µm. Due to optics of the system, the maximum part size in the XY plane is 4 mm by 6 mm. The printer allows for parts up to 36 mm tall to be printed. A linear actuator (Zaber NA11B60) was used to control the movement of a custom 3D printed stage made by thermoplastic filament extrusion.

3D Printing Using Large-Area Mask-Projection Scanning Stereolithography

The machine for large-area mask-projection SLA included a UV light source, conditioning optics, a dynamic mask generator (Projector) mounted on a XY linear stages, imaging optics, and a container with a stage mounted on a linear actuator. A Blue Wave 75 UV Curing spot lamp (300-500 nm) with intensity adjustment from Dymax was chosen as a source of ultraviolet light. The conditioning optics (Edmund Optics) ensured that the entire dynamic mask is illuminated by UV-vis light while the imaging optics focused the patterned light onto the photopolymer surface at a magnification ratio of 1:1. The dynamic mask included a DLP 0.55 XGA DMD from Texas Instruments with a 1024×768 rectangular array of aluminum micromirrors. Each square micromirror has a side length of 10.8 µm producing an effective full projection area of approximately 11.05 mm×8.29 mm at the surface of the resin. The achievable scan speeds lie in the range of 0-22 mm s$^{-1}$. The 200 mL vat size constrains the Z direction to a maximum of 50 mm. The build platform was fabricated using thermoplastic filament extrusion and tiled with glass microscope slides (AMScope BS-50P-100S-22). The linear actuators (Zaber A-LST0500A-E01, A-LST0250A-E01) for the X, Y, and Z motion were controlled using custom software developed in LabVIEW. A radiometer (UVP: UVX Radiometer with UVX-36 Sensor) was used to measure the intensity of the 3D printer's light source at 365 nm. The total intensity over the spectral range (300-500 nm) was calculated by correlating the measured intensity of the light source at 365 nm with the spectral distribution provided by the manufacturer. The assessed intensity of 250 mW cm$^{-2}$ was used as a baseline for conducting the photorheology and photoDSC experiments.

Post-Processing of 3D Printed Structures

The 3D printed structures were carefully wrapped in Kleenex™ paper towels, and placed over a perforated stage. These samples were subjected to air-drying over a period of 48 h. The samples were placed on a perforated metal stage, and heated in a vacuum oven to 25° C., 60° C., 100° C. and 150° C., for 1 h each. They were then transferred and heated in a N$_2$ furnace at 200° C., 300° C. and 350° C. for 1 h each.

Discussion

This example demonstrates 3D-printed structures of PMDA-ODA, an engineering thermoplastic polymer. The synthesis of soluble poly(amic ester)s containing pendant photo-crosslinkable acrylate groups permits dissolution of the precursor polymer in a nonreactive, organic solvent. The addition of a photoinitiator provides free radical formation under light, which enables 3D printing. Two custom printers based on mask-projection micro-stereolithography (MPµSL) and large-area mask-projection scanning stereolithography (MPSSL) generate 3D objects from a polymer solution. Upon controlled solvent removal and postprinting thermal imidization, the crosslinked, 3D organogel converts to the thermoplastic PMDA-ODA polyimide. Due to an isotropic dimensional shrinkage of 53%, part resolution and structural integrity remain excellent. An important feature for obtaining the thermoplastic polymer from a thermoset is the polyimide product stability at high temperatures ($T_d$ is 600° C.). The comparatively lower $T_d$ of the aliphatic acrylate crosslink points ($T_d$<350° C.) facilitated removal during the postprocessing step, resulting in a thermoplastic. In addition, this example demonstrates that a high-molecular-weight polymer is printable upon dissolution in an organic solvent.

Figure 1:
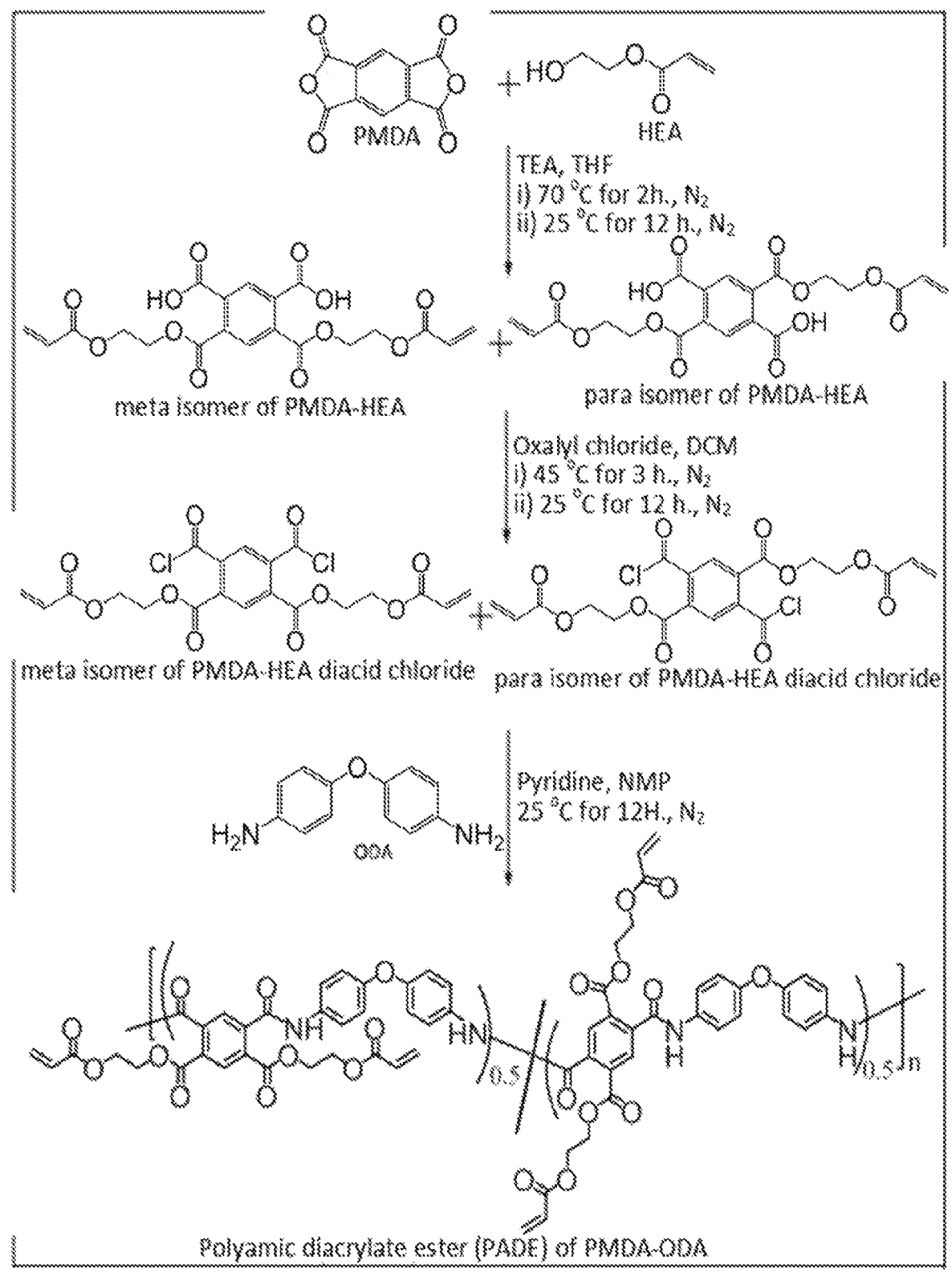
FIG. 1 depicts the synthesis of soluble precursor polymer (PADE), which possesses photocrosslinkable acrylate groups. Each repeating unit of the precursor polymer contains two pendant diacrylate moeities that can participate in photocrosslinking reactions.

Conventional synthesis of PMDA-ODA polyimide employs a two-step process: polycondensation of PMDA and ODA to yield a soluble precursor polymer, i.e. polyamic acid formation, with subsequent thermal imidization up to 350° C. as a polyamic acid film. Alternatively, polyamic dialkyl ester of PMDA and ODA is also often utilized as soluble precursor polymers. However, MPSL requires the incorporation of photo-crosslinkable moieties (e.g. acrylates) into the molecular structure. Ring opening of PMDA with an acrylic alcohol such as hydroxyethyl acrylate affords a diacrylate ester-diacid, which is converted to a reactive diacrylate ester-diacid chloride under reaction conditions (FIG. 1). Polymerization of the diacrylate ester-diacid chloride with ODA provides the functionalized soluble precursor polymer (FIG. 14). Size exclusion chromatography (SEC) confirmed the polyamic diacrylate ester (PADE) of PMDA-ODA has a number-average molecular weight (Mn) of 49 100 g mol-1 and polydispersity of 1.90.

Figure 3:
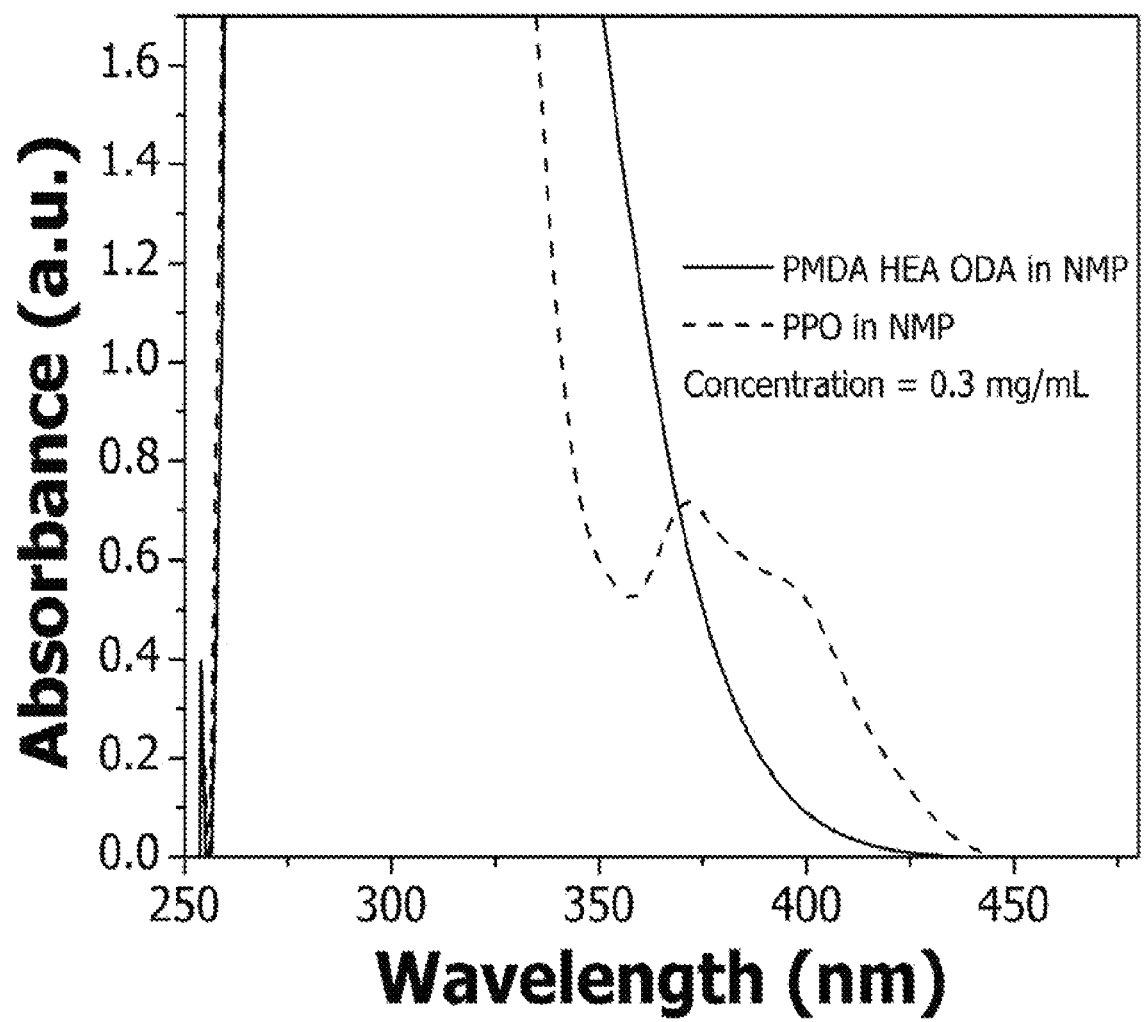
FIG. 3 is a graph of the UV-Vis spectra of PADE and PPO photoinitiator in NMP.

FIG. 14 highlights the conditions used during photopolymerization and a scheme to illustrate the resulting 3D-printed objects. A concentration of 15 wt % of PADE in NMP was suitable for MPµSL. The absorption spectra using UV-vis spectrometry of PADE in NMP guided the selection of the photoinitiator (FIG. 3). In NMP, PADE absorbs strongly in the UV wavelength range, thus precluding the use of typical UV absorbing photoinitiators. Phosphine oxide based photoinitiators such as PPO have a local maxima in the visible range and therefore is suitable for photocrosslinking PADE in NMP. Phenylbis(2,4,6-trimethylbenzoyl)phosphine oxide (PPO) has a local absorption maxima in the visible spectrum at 405 nm and provided sufficient initiating radicals to crosslink PADE in NMP.

Figure 4:
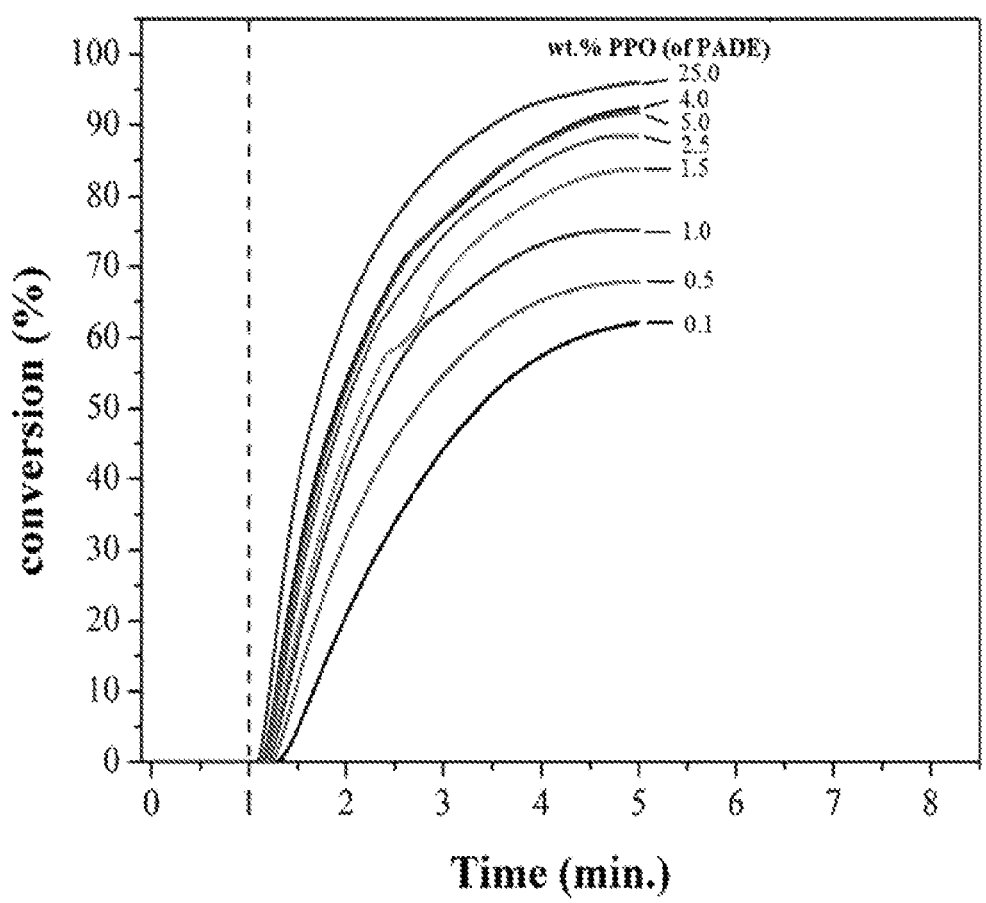
FIG. 4 is a graph of the crosslink extent (%) curves containing varying PPO amounts as a function of irradiation time from PhotoDSC curves.
Figure 5:
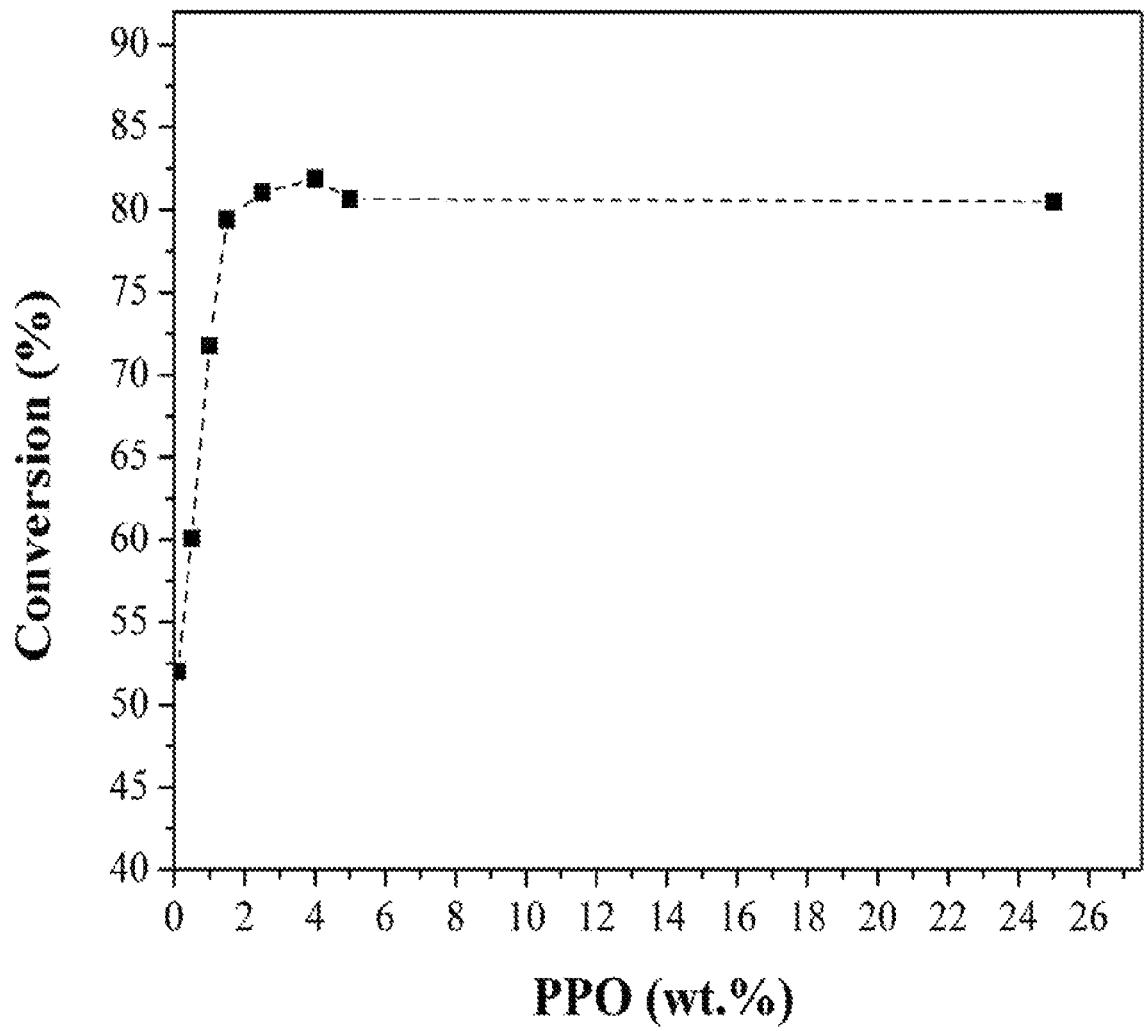
FIG. 5 is a graph of the final crosslink extent (%) obtained as a function of PPO photoinitiator content.

In addition to printer optics, a parameter governing print quality is the extent of crosslinking. A differential scanning calorimeter (DSC) equipped with a photocalorimetry accessory (PhotoDSC) elucidated the extent of PADE crosslinking using PPO in NMP (FIG. 4). The wt. % PPO is calculated with respect to PADE. The irradiation is started after equilibration for 1 min. The slope of the conversion curves are nearly the same for PPO concentrations between 2.5 and 5 wt. % PPO. This indicates similar photocrosslinking kinetics. As a result of NMP plasticization, 2.5 wt % PPO resulted in high acrylate conversions (=80%) (FIG. 5) Above 1.5 wt. % PPO, only a minimal change in final conversion (%) is observed. In contrast, photo-crosslinking of common liquid photopolymers achieves limited conversion due to formation of a rigid, crosslinked network that increases Tg. In addition to the extent of crosslinking, modulus increase during photo-crosslinking is an important variable in determining printability. This is especially true when using a large amount (85 wt %) of nonreactive solvent.

Figure 6:
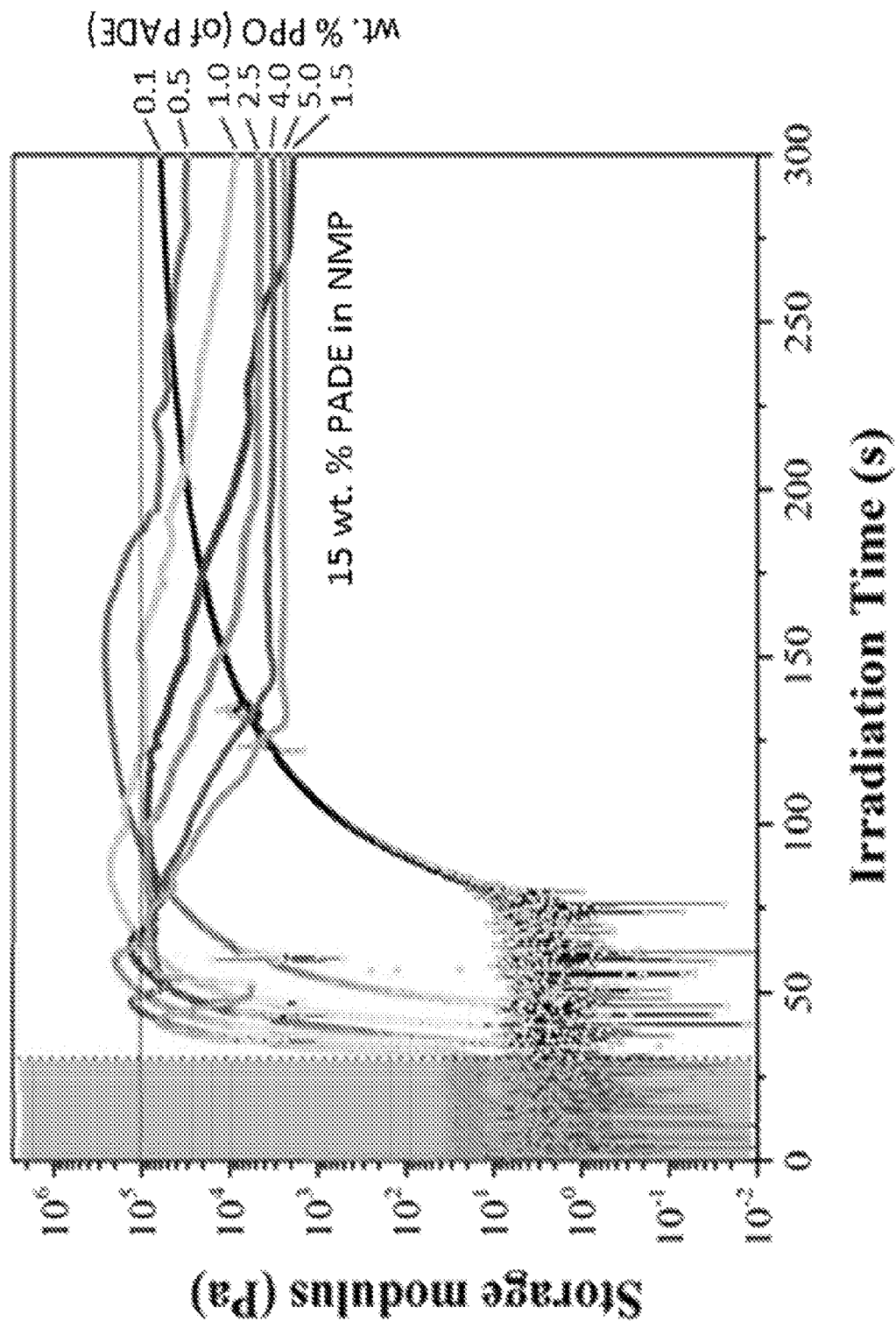
FIG. 6 is a graph of the storage modulus as a function of irradiation time from photorheology experiments. Irradiation is started after equilibration for 30 s.
Figure 7:
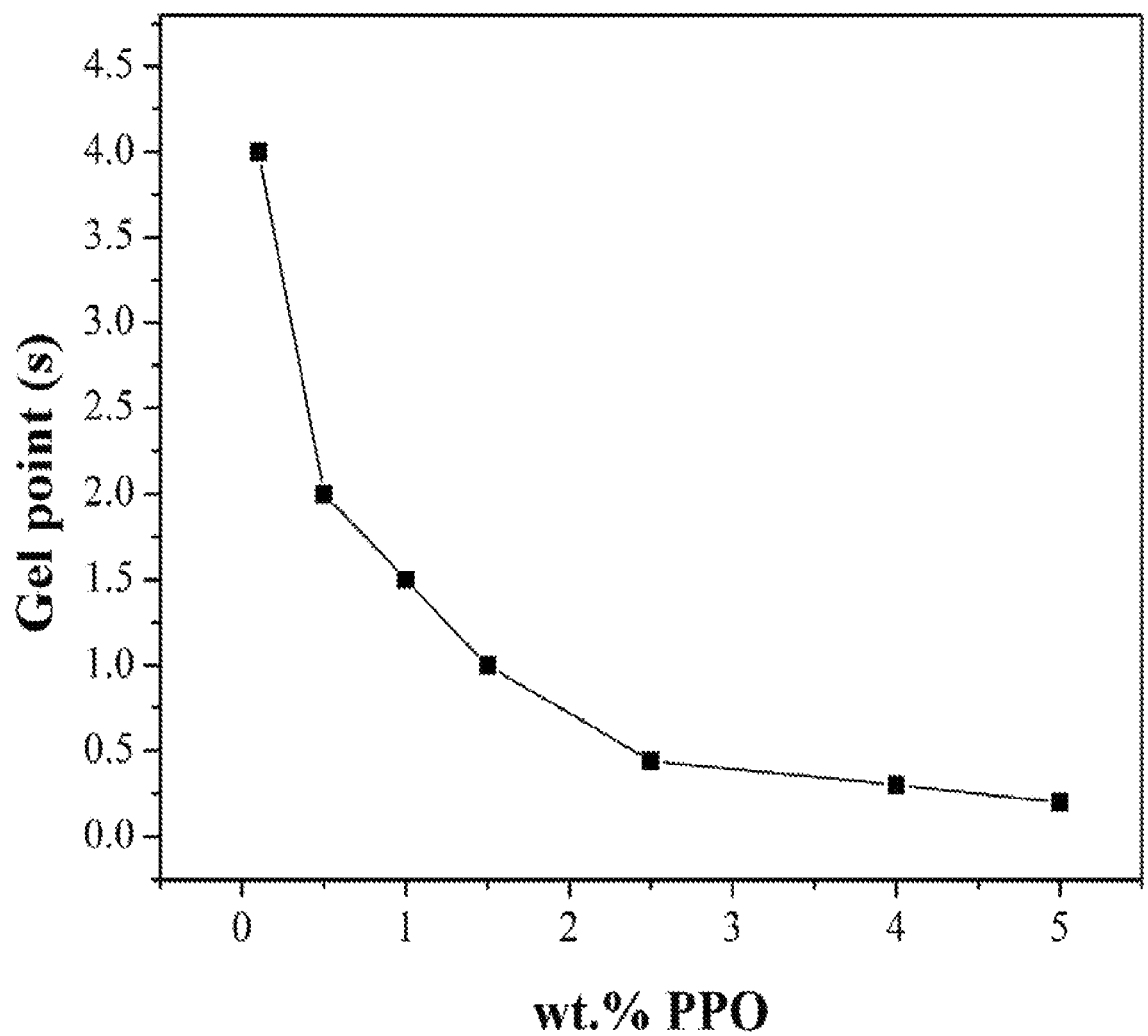
FIG. 7 is a graph of the gel point (defined as crossover time of G' and G") as a function of PPO wt. %. Above 1.5 wt. % PPO, the gel point decreases marginally.

Oscillatory strain experiments using photorheology revealed an increase in storage modulus (G') as a function of irradiation time (FIG. 6). Above 2.5 wt % PPO, the rate of increase in G' was nearly constant and remained constant within 20 s of irradiation. Stopping the photorheology experiments at different irradiation points allowed the determination of the minimum G' for achieving self-supporting films ($10^3$ Pa). The crossover of G' and G" approximated the gel point, which signified the transformation of a liquid to a gel upon network formation. The gel point is a critical engineering parameter to achieve quality printed structures. Utilizing 2.4 wt % PPO, the gel point occurred in =0.5 s (FIG. 7). PhotoDSC, photorheology, and optical microscopy ensured that 2.5 wt % PPO provided sufficient resolution and structure fidelity. Furthermore, addition of 1.5 wt % of a light absorbing dye (4-nitrophenol) improved print fidelity with less cure through.

A custom MPµSL machine, which was described in a previous publication enabled fabrication of "high-resolution" 3D structures (FIG. 15). (See A. R. Schultz, P. M. Lambert, N. A. Chartrain, D. M. Ruohoneimi, Z. Zhang, C. Jangu, M. Zhang, C. B. Williams, T. E. Long, ACS Macro Lett. 2014, 3, 1205.) Exposing the resin to 250 mW cm$^{-2}$ with a broadband spectrum (300-500 nm) light source for 8 s per layer generated structures with 100 µm layer thicknesses. Furthermore, layer shrinkage did not occur during the printing process. The layering visible on the surface of the part was attributed to Gaussian distribution of light inside the resin, but this does not imply that distinct interfaces exist in the internal microstructure. Despite using only 15 wt % PADE in NMP, complex 3D anisotropic structures were generated with micrometer-scale resolution (FIG. 15). A top-down MPSSL machine (FIG. 16) enabled 3D structures with dimensions larger than 15 mm.[16,19] Scanning a dynamic-moving mask over the surface of the photopolymer resulted in 150 µm layer thickness and a spatial resolution of 125 µm over large print areas. A recoating mechanism in the MPSSL technique allowed processing of photopolymers with viscosities in the range of 5-15 Pa s. The printing speed of the MPSSL technique was dependent on the tunable photocuring kinetics and recoating speed. The optimal setting correlated to a manufacturing speed of 25 mm h$^{-1}$ for the tensile specimen (FIG. 16) with overall dimensions of 15-55 mm.

Figure 8:
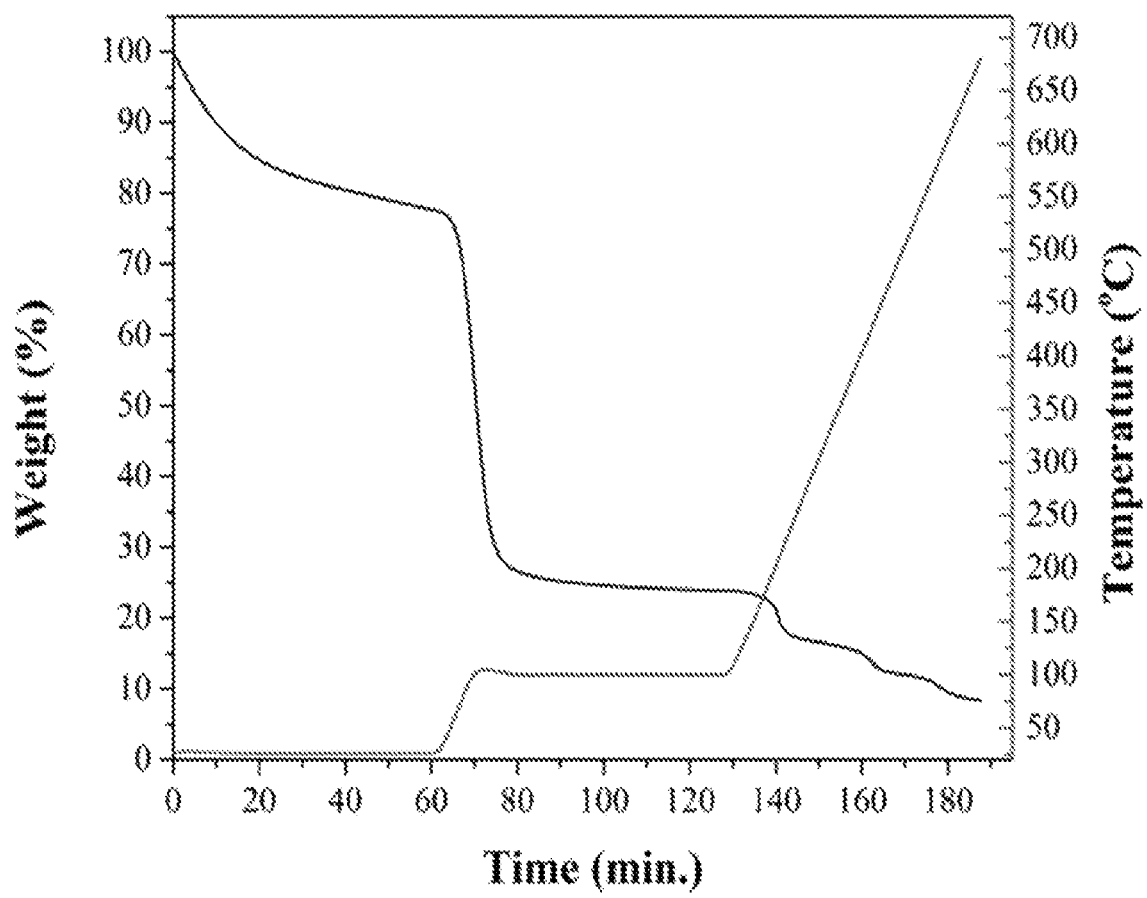
FIG. 8 is a graph of the weight (%) from thermogravimetric analysis (TGA) in nitrogen atmosphere as a function of time for a wet, 3D printed part. The temperature as a function of time is plotted on the Y-axis.

Postprocessing of 3D-printed PADE to PMDA-ODA polyimide included two steps (FIG. 17). In the first step, NMP removal increased the mechanical rigidity of the structure. The second step transformed the crosslinked precursor to polyimide upon thermal elimination of crosslinkers and concurrent cyclization. The heating of the solvated 3D structure resulted in warping, shrinkage, and breakage into multiple pieces due to buildup of internal stress. Pad drying coupled with air-drying over a perforated metal substrate enabled removal of NMP uniformly at =25° C., while preserving structural integrity. Over 48 h, this resulted in a 40 wt % reduction. A Fourier transform infrared (FTIR) spectroscopy detector attached to the outlet port of a thermogravimetric analyzer (TGA) confirmed removal of NMP during the isothermal step (FIG. 8). Continued heating of the sample to 100° C., with a subsequent 1 h isothermal event resulted in an overall weight loss of =75% due to further NMP loss (FIG. 8).

The onset of thermally induced elimination of crosslinks and cyclization (imidization) occurred at 150° C. If one assumes that the 3D structure has the same composition as the photopolymerizable solution, the expected weight loss upon full conversion of the solvated, 3D structure to polyimide is 91%. The 3D structures lost 85 wt % when heated to 400° C. in the TGA (FIG. 8). The loss of NMP during sample preparation accounted for the difference between theoretical and experimental values. These results strongly suggested that the solvated, 3D structure formed was a 3D organogel. The use of reactive diluents is commonplace in the literature; however, only few reports of 3D printing photopolymers with SLA using nonreactive diluents exist. Despite the presence of 85 wt % NMP in the 3D structure, the crosslinked PADE had enough mechanical rigidity to maintain structural and geometric integrity.

Figure 9:
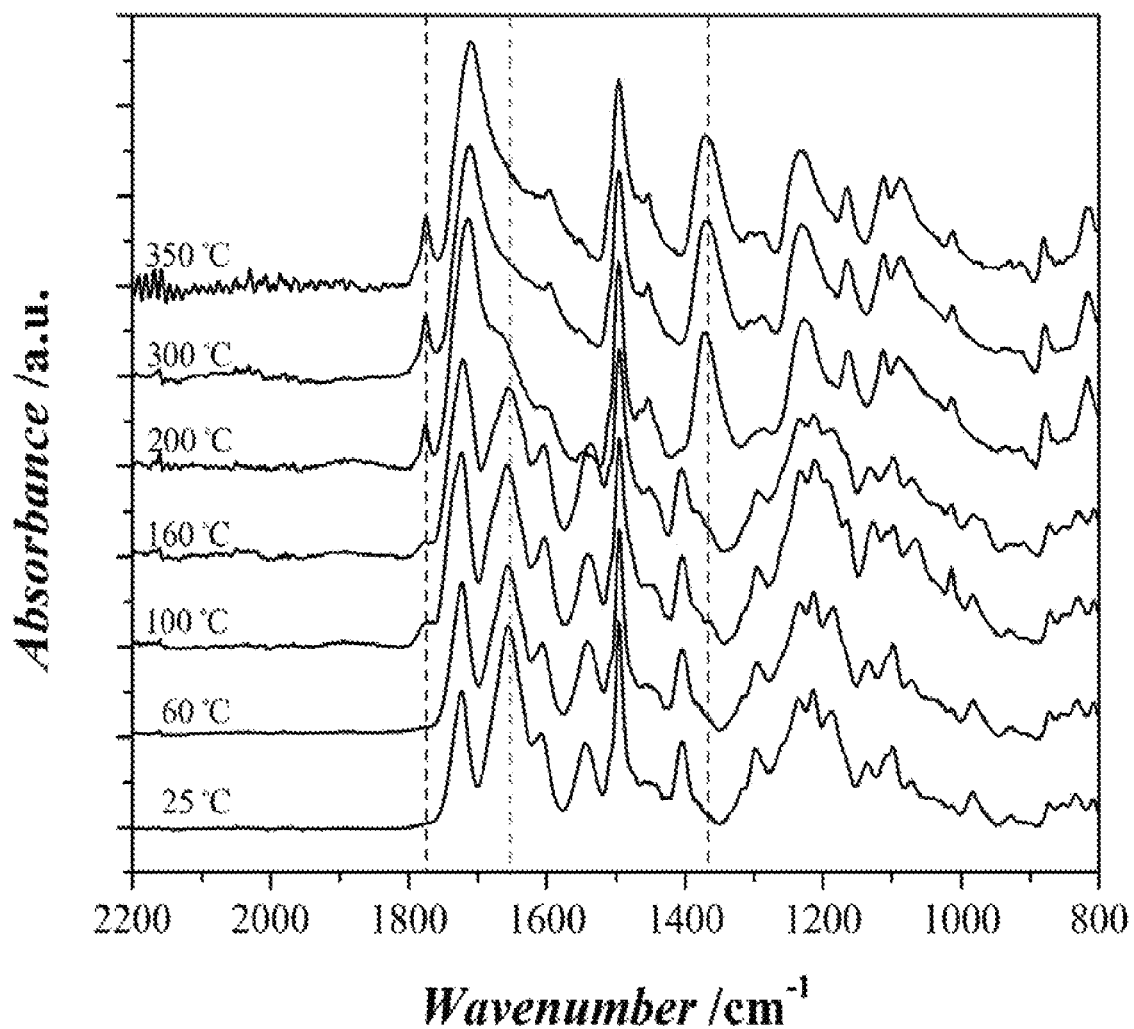
FIG. 9 is a graph of the FTIR curves of 3D printed parts thermally heated and imidized at different temperatures. The curves have been normalized to the aromatic C—C peak at 1495 cm-1. The dotted lines in black denotes the imide peaks formed during imidization. The dotted line in orange indicates the peaks from the amide groups from the amic ester intermediate that are converted to the imide
Figure 10:
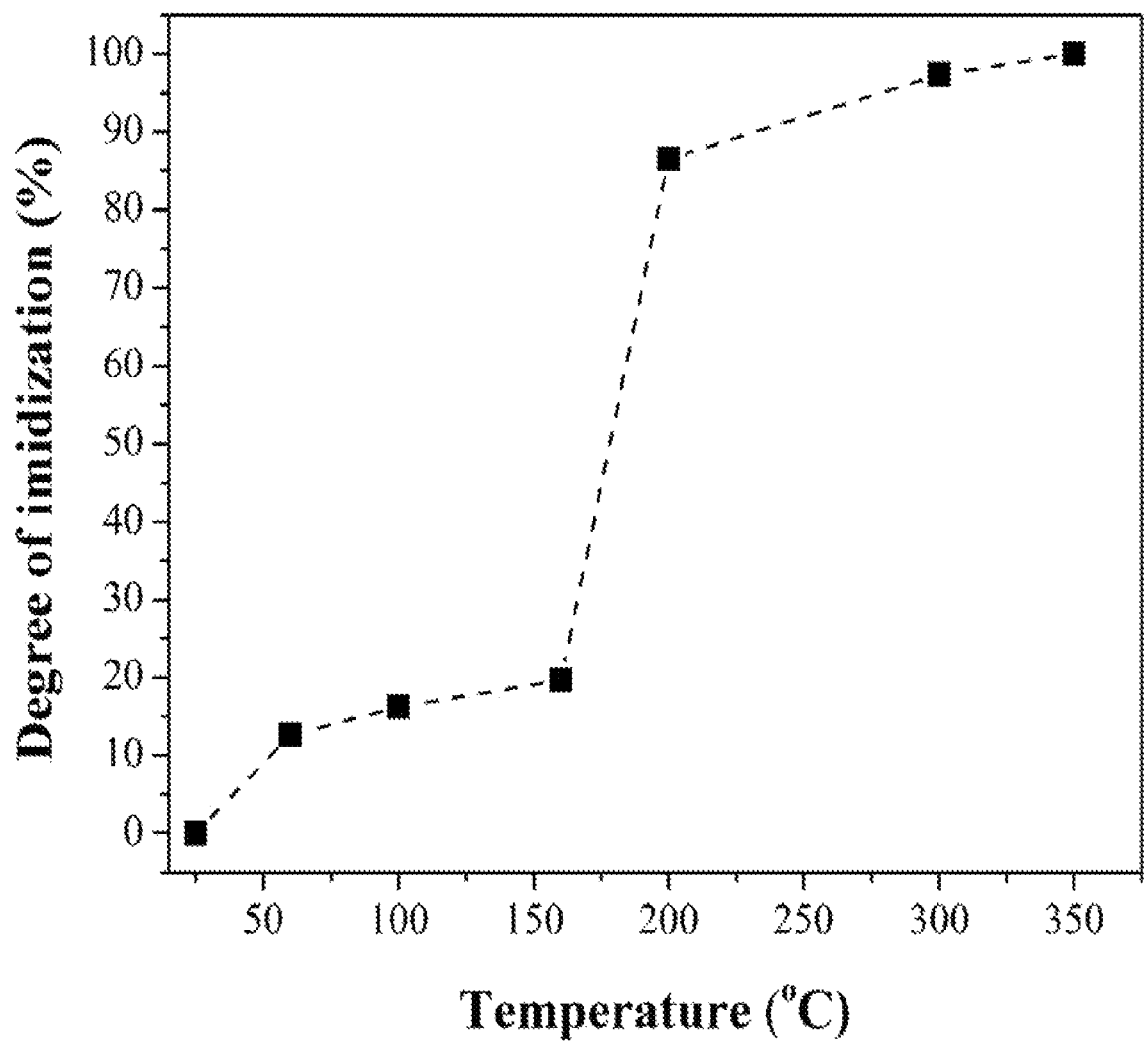
FIG. 10 is a graph of the degree of imidization as a function of post-processing temperature from FTIR curves. The thermal imidization is complete at 350° C. Thermal imidization results in the appearance of a peak at 1370 cm-1 due to C—N stretching vibrations of the imide moiety. Additionally, the peak at 1780 cm$^{-1}$ from the C=O groups in the imide increases in intensity. The imide content in samples heated up to different temperatures are calculated using the formula.

FTIR analysis of 3D structures upon heating to different temperatures enabled confirmation of complete imidization (FIG. 9). The peak at 1370 cm$^{-1}$ due to C—N stretching vibrations of the imide moiety was utilized to quantify the extent of imidization (FIG. 10). The imidization proceeded rapidly above 150° C., and was complete at 350° C. Based on TGA analysis, fully imidized 3D structures exhibited a Td of 590° C., similar to PMDA-ODA films prepared using the conventional method (FIG. 11). These results confirmed the transformation of the 3D-printed structure from a thermoset to a thermoplastic polyimide. The strength of this method lies in the fact that both the synthetic method and 3D-printing strategy are versatile a extendable to diverse polyimide compositions.

A consequence of the solvent removal and transformation from PADE to PMDA-ODA is dimensional shrinkage (FIG. 17) of the 3D structures. The majority of the shrinkage (32%) occurred during removal of NMP from the 3D structures during the air-drying step. Furthermore, due to isotropic shrinkage even after complete imidization at 350° C., there was no detectable loss in structural integrity or part fidelity. Rubner observed a similar thickness shrinkage value for 2D photoresists prepared using photolithography.

3D printing using a layer-by-layer fabrication technique typically results in anisotropic material properties depending upon material build orientations. In MPSL, surface (external) and internal layers are observed due to fundamentally different reasons. The surface layers are an aberration of the 3D-printing process due to a Gaussian distribution of the incident irradiation within a liquid resulting in a staircasing effect (FIG. 15). However, this layering is limited to the external surface only. These surface layers exist even in the fully imidized 3D structure. In contrast, internal layers are formed due to lack of adequate adhesion between subsequent print layers. The presence of visible layered surfaces on the 3D-printed structures (FIG. 15) necessitated an investigation of the internal microstructure using SEM. Cryofracturing of 3D tensile specimens thermally treated at 60, 200, and 300° C. along a plane perpendicular to the print direction afforded SEM images of the cross-sections (FIG. 19). Irrespective of the postprocessing temperature, all three cross sections exhibited a consolidated microstructure, and did not exhibit the layer patterning observed in layer-by-layer extrusion-based fabrication techniques. We rationalize the lack of layering based on the plasticizing effect of solvent in the 3D organogel.

3D-printed specimens exhibited a storage modulus (E2) greater than 1 GPa until 300° C., which reduced to 0.2 GPa upon further heating to 400° C. (FIG. 12). Tensile tests of 3D-printed specimens revealed an average Young's modulus of 2.2 GPa and ~80 MPa ultimate tensile strength (FIG. 13). Generally, the (thermo)mechanical properties of polymeric structures are dependent on the processing method. However, the properties of 3D-printed PMDA-ODA are similar to PMDA-ODA films prepared using the conventional two-step technique. Based on literature precedent, we anticipate 3D structural components developed using computational design to exhibit enhanced mechanical properties.

Thermoplastic materials encompass a wide range of tensile moduli and strengths, however the $T_g$ of most engineering plastics is limited to 300° C. (FIGS. 20A-20B). 3D-printed PMDA-ODA has mechanical properties on par with many other engineering thermoplastics but is unique with a $T_g$ above 400° C. As demonstrated in Ashby plots (FIGS. 20A-20B), 3D-printed polymeric materials that exhibit a similar combination of mechanical and thermal properties do not exist.

We have demonstrated MPSL as an effective manufacturing tool in creating 3D structures of thermoplastic polymers such as PMDA-ODA. 3D-printed PMDA-ODA offers significant impact in the aerospace industry. Films and coatings of PMDA-ODA find applications on satellites due to their excellent high temperature, radiation, and atomic oxygen stability at low-earth orbit, low flammability, and as electrically insulating materials. In such applications, 3D structures of PMDA-ODA offer opportunities to further reduce weight and improve functionality through computational design of parts. The method described in this example is also applicable to complex structures of other all-aromatic, rigid-rod polymers prepared using a soluble precursor such as poly(benzoxazole)s.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A polymer resin for vat photopolymerization, the polymer resin comprising:
    a polyamic diacrylate ester or salt thereof, the polyamic diacrylate ester or salt comprising a plurality of photocrosslinkable groups pendantly attached thereto;
    a photoinitiator suitable for initiating crosslinking of the photocrosslinkable groups when exposed to a light source of a suitable wavelength and intensity; and an organic solvent wherein the polyamic diacrylate ester comprises repeat units having a structure according to the following formula:

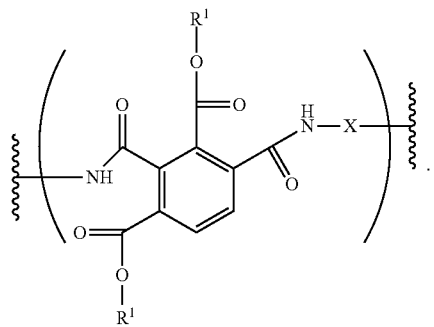

2. A polymer resin for vat photopolymerization, the polymer resin comprising:
    a polyamic diacrylate ester or salt thereof, the polyamic diacrylate ester or salt comprising a plurality of photocrosslinkable groups pendantly attached thereto;
    a photoinitiator suitable for initiating crosslinking of the photocrosslinkable groups when exposed to a light source of a suitable wavelength and intensity; and an organic solvent wherein the polyamic diacrylate ester comprises repeat units having a structure according to the following formula:

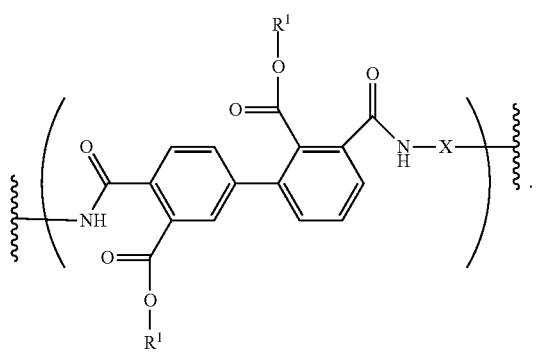

3. A polymer resin for vat photopolymerization, the polymer resin comprising:
 a polyamic diacrylate ester or salt thereof, the polyamic diacrylate ester or salt comprising a plurality of photocrosslinkable groups pendantly attached thereto;
 a photoinitiator suitable for initiating crosslinking of the photocrosslinkable groups when exposed to a light source of a suitable wavelength and intensity; and an organic solvent wherein the polyamic diacrylate ester comprises repeat units having a structure according to the following formula:

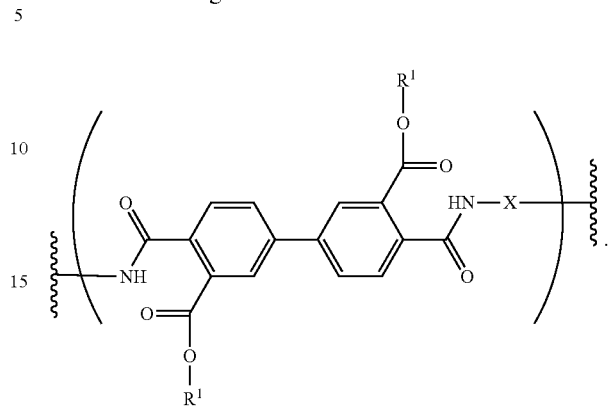

* * * * *